United States Patent
Khabashesku et al.

(10) Patent No.: US 8,420,717 B2
(45) Date of Patent: *Apr. 16, 2013

(54) POLYOL FUNCTIONALIZED WATER SOLUBLE CARBON NANOSTRUCTURES

(75) Inventors: Valery N. Khabashesku, Houston, TX (US); Oleksandr Kuznetsov, Houston, TX (US); Rui Lobo, Almada (PT)

(73) Assignee: William Marsh Rice University, Houston, TX (US)

( * ) Notice: Subject to any disclaimer, the term of this patent is extended or adjusted under 35 U.S.C. 154(b) by 314 days.

This patent is subject to a terminal disclaimer.

(21) Appl. No.: 12/670,068

(22) PCT Filed: Jul. 23, 2008

(86) PCT No.: PCT/US2008/070914
§ 371 (c)(1),
(2), (4) Date: Jul. 26, 2010

(87) PCT Pub. No.: WO2009/058443
PCT Pub. Date: May 7, 2009

(65) Prior Publication Data
US 2010/0317820 A1 Dec. 16, 2010

Related U.S. Application Data

(60) Provisional application No. 60/951,345, filed on Jul. 23, 2007.

(51) Int. Cl.
C08G 59/18 (2006.01)
C08L 63/00 (2006.01)
C08K 9/04 (2006.01)
C08K 7/00 (2006.01)

(52) U.S. Cl.
USPC ........... 523/468; 977/738; 977/740; 977/746; 977/748; 977/753; 977/778; 977/785; 977/786; 977/787; 977/904; 977/906

(58) Field of Classification Search .................. None
See application file for complete search history.

(56) References Cited

U.S. PATENT DOCUMENTS

| | | | |
|---|---|---|---|
| 7,601,421 B2* | 10/2009 | Khabashesku et al. .... | 428/297.4 |
| 7,632,481 B2* | 12/2009 | Khabashesku et al. .... | 423/447.1 |
| 8,187,703 B2* | 5/2012 | Zhu et al. ................... | 428/297.4 |
| 2004/0067892 A1* | 4/2004 | Mikata et al. ................... | 514/23 |
| 2004/0219092 A1 | 11/2004 | Bening et al. | |

FOREIGN PATENT DOCUMENTS

| WO | 2005/012171 | 2/2005 |
| WO | WO 2005028174 A2 * | 3/2005 |
| WO | WO 2005028740 A2 * | 3/2005 |

OTHER PUBLICATIONS

International Search Report and Written Opinion for PCT/US2008/070914 mailed Mar. 24, 2010.
Zhang, et. al., "Sidewall Functionalization of Single-Walled Carbon Nanotubes with Hydroxyl Group-Terminated Moieties", Chem. Mater., 16:2004, pp. 2055-2061.
Khabashesku, et. al., "Functionalized carbon nanotubes and nanodiamonds for engineering and biomedical applications", Diamond Rel. Mater., 14:2005, pp. 859-866.
Khabashesku, et. al., "Chemical modification of carbon nanotubes", Mendeleev Comm. 16:2006, pp. 61-66.
Zhang, et. al., "Soluble functionalized carbon nanotube/poly(vinyl alcohol) nanocomposite as the elecgrode for glucose sensing", Smart Mater. Struct., 15:2006, pp. 123-128.
Liu, et. al., Functionalization of Nanoscale Diamond Powder: Fluoro-, Alkyl-, Amino-, and Amino Acid-Nanodiamond Derivatives, Chem. Mater., 16:2004, pp. 3924-3930.
Khabashesku, et al., Fluorination of Singe-Wall Carbon Nanotubes and Subsequent Derivatization Reactions, Acc. Chem. Res., 35:2002, pp. 1087-1095.

* cited by examiner

*Primary Examiner* — Michael J Feely
(74) *Attorney, Agent, or Firm* — Winstead PC

(57) ABSTRACT

A method of making a water soluble carbon nanostructure includes treating a fluorinated carbon nanostructure material with a polyol in the presence of a base. A water soluble carbon nanostructure comprises a fluorinated carbon nanostructure covalently bound to a polyol. Exemplary uses of water soluble carbon nanostructures include use in polymer composites, biosensors and drug delivery vehicles.

19 Claims, 26 Drawing Sheets

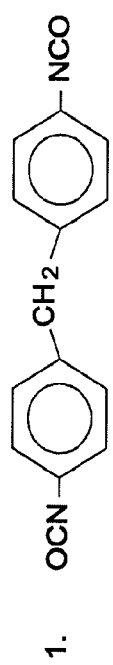
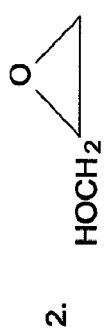
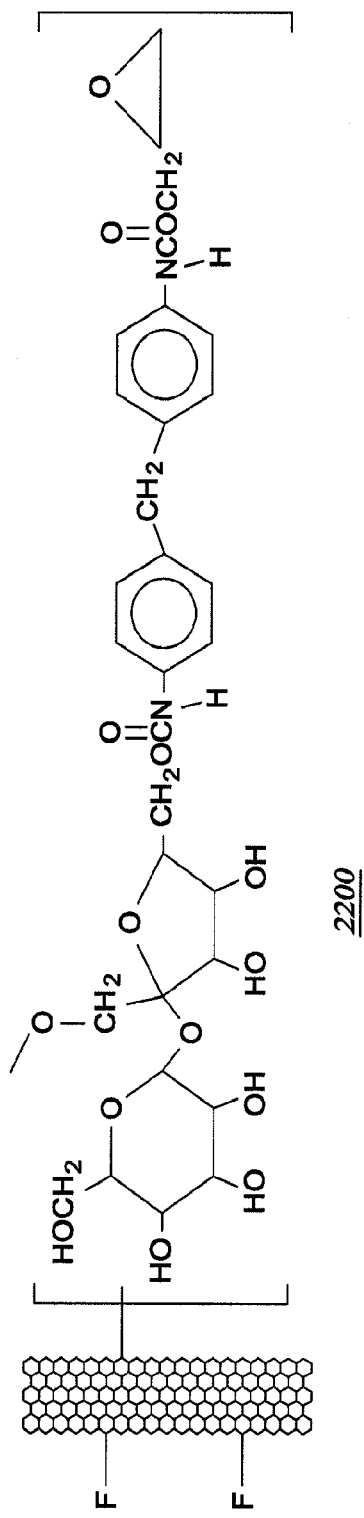
Fig. 22

POLYOL FUNCTIONALIZED WATER SOLUBLE CARBON NANOSTRUCTURES

CROSS-REFERENCE TO RELATED APPLICATIONS

This application claims priority to U.S. provisional patent application 60/951,345, filed Jul. 23, 2007, which is incorporated by reference as if written herein in its entirety.

STATEMENT REGARDING FEDERALLY SPONSORED RESEARCH

This invention was made with government support under Grant No. N RUE 2-2659-MO-05, awarded by of the U.S. Civilian Research and Development Foundation for Independent States of the Former Soviet Union (CRDF); and Grant No. NNX07A133G, awarded by the National Aeronautics Space Administration. The government has certain rights in the invention.

BACKGROUND

The mechanical, electronic, thermal and tribiology properties of single-wall carbon nanotubes (SWCNTs), carbon nano-onions (CNO) and nanodiamond (ND) particles offer significant potential as components for the design of new materials (A. Hirsch, "Functionalization of single-walled carbon nanotubes," *Angew. Chem. Int. Ed Engl.* 2002:41(11), pp. 1853-1859; S. Banerjee, T. Hemraj-Benny and S. S. Wong, "Covalent surface chemistry of single-walled carbon nanotubes," *Adv. Mater.* 2005:17(1), pp. 17-29; Y. Show, M. A. Witek, P. Sonthalia, G. M. Swain, "Characterization and electrochemical responsiveness of boron-doped nanocrystalline diamond thin-film electrodes," *Chem. Mater.* 2003:15, pp. 879-888; E. Wilks, J. Wilks, *Properties and Applications of Diamond,* 1997, Butterworth: Oxford, England; M. Choi, I. S. Altman, Y. J. Kim, P. V. Pikhitsa, S. Lee, G. S. Park, T. Jeong, J. B. Yoo, "Formation of shell-shaped carbon nanoparticles above a critical laser power in irradiated acetylene," *Adv. Mater.* 2004:16, pp. 1721-1725; J. C Francis, *Solid Lubricants and Self-Lubricating Solids,* 1972, Academic Press: New York; Y. Liu, R. L. Vander Wal, V. N. Khabashesku, "Functionalization of carbon nano-onions by direct fluorination," *Chem. Mater.* 2007:19(4), pp. 778-786, 2007). In spite of the promise offered by new materials based on these carbon nanostructures, processing difficulties resulting from the limited solubility of these species in common solvents has slowed the development of carbon nanostructure materials. Functionalization or derivatization of carbon nanostructures has been pursued as a means to increase their solubility in solvents and facilitate their incorporation into new materials and devices. Beneficial aspects resulting from properties of the functionalizing group may also be conferred to functionalized carbon nanostructures. Functionalized carbon nanostructures soluble in water are of particular interest due to this solvent's role in biological systems and its benign environmental impact. Water-soluble carbon nanostructures have attracted significant attention for biomedical applications, including biosensing and drug delivery (A. Bianco, K. Kostarelos, C. D. Partidos, M. Prato, "Biomedical applications of functionalized carbon nanotubes," *Chem. Commun.* 2005, pp. 571-577).

Water solubilization of carbon nanostructures has been achieved through surface activation via strong oxidizing acid treatment and multi-step derivatization using coupling reactions, many of which utilize expensive PEG-based coupling reagents (A. Bianco, K. Kostarelos, C. D. Partidos, M. Prato, "Biomedical applications of functionalized carbon nanotubes," *Chem. Commun.* 2005, pp. 571-577; A. S. Rettenbacher, B. Elliott, J. S. Hudson, A. Amirkhanian, L. Echegoyen, "Preparation and functionalization of multilayer fullerenes (carbon nano-onions)," *Chem. Eur. J.* 2005:12, pp. 376-387; A. Krüger, Y. Liang, G. Jane, J. Stegk, "Surface functionalization of detonation diamond suitable for biological applications," *J. Mater. Chem.* 2006:16, pp. 2322-2328; J. J. Stephenson, J. L. Hudson, A. D. Leonard, B. K. Price, J. M. Tour, "Repetitive functionalization of water-soluble single-walled carbon nanotubes. addition of acid-sensitive addends," *Chem. Mater.* 2007:19, pp. 3491-3498; F. Liang, J. M. Beach, P. K. Rai, W. Guo, R. H. Hauge, M. Pasquali, R. E. Smalley, W. E. Billups, "Highly exfoliated water-soluble single-walled carbon nanotubes," *Chem. Mater.* 2006:18(6), pp. 1520-1524). The harsh conditions of oleum treatment may cause sidewall etching and impact the mechanical properties of the nanotube. Further, these conditions may be unsuitable for the sensitive functionalities sometimes required for biomedical applications.

Fluorinated SWCNTs may be reacted under mild conditions with various agents, including amino acids, urea, amino alcohols, and diols to produce stable suspensions in water (Y. Liu, Z. Gu, J. L. Margrave, V. N. Khabashesku, "Functionalization of nanoscale diamond powder: fluoro-, alkyl-, amino-, and amino acid-nanodiamond derivatives," *Chem. Mater.* 2004:16, pp. 3924-3930; L. Zhang, V. U. Kiny, H. Peng, J. Zhu, R. F. M. Lobo, J. L. Margrave, V. N. Khabashesku, "Sidewall functionalization of single-walled carbon nanotubes with hydroxyl group-terminated moieties," *Chem. Mater.* 2004:16, pp. 2055-2061). Although these materials may be dispersed as a suspension, they lack true solubility as a well dispersed solution having long term stability.

In light of the foregoing, it would be beneficial to provide additional water soluble carbon nanostructures and to develop methods for preparation thereof.

SUMMARY

In some aspects, the present disclosure provides a method of making a water soluble carbon nanostructure comprising treating a fluorinated carbon nano structure material with a polyol in the presence of a base.

In other aspects, the present disclosure describes a water soluble carbon nanostructure comprising a fluorinated carbon nanostructure material covalently bound to a polyol.

In another aspect, the present disclosure describes a polymer composite incorporating a water soluble carbon nanostructure that is prepared by the methods described herein.

In still another aspect, the present disclosure describes use of water soluble carbon nanostructures in biosensors and as drug delivery vehicles.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing a specific embodiment of the disclosure, wherein:

FIG. 22 shows the reaction of sucrose functionalized SWCNTs with 4,4'-methylenebis(phenylisocyanate) (step 1) and glycidol (step 2) to produce epoxy functionalized SWCNTs.

DETAILED DESCRIPTION

Figure 1:
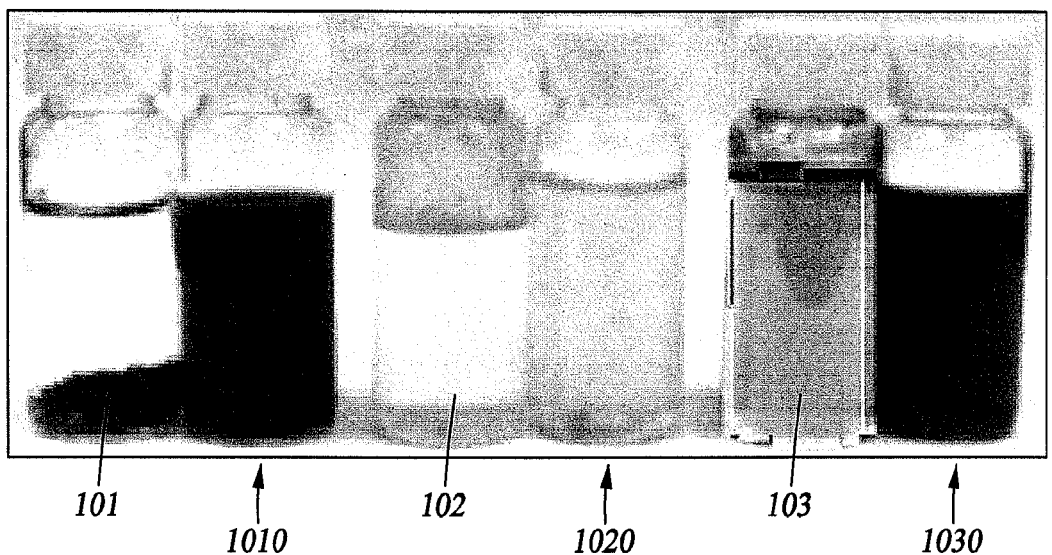
FIG. 1 shows a photograph demonstrating the comparative water solubility between SWCNTs and sucrose functionalized SWCNTs, nanodiamond and sucrose functionalized nanodiamond, and carbon nano-onions and sucrose functionalized carbon nano-onions.

In the following description, certain details are set forth such as specific quantities, sizes, etc. so as to provide a thorough understanding of the present embodiments disclosed herein. However, it will be obvious to those skilled in the art that the present disclosure may be practiced without such specific details. In many cases, details concerning such considerations and the like have been omitted inasmuch as such details are not necessary to obtain a complete understanding of the present disclosure and are within the skills of persons of ordinary skill in the relevant art.

Referring to the drawings in general, it will be understood that the illustrations are for the purpose of describing a particular embodiment of the disclosure and are not intended to be limiting thereto.

While most of the terms used herein will be recognizable to those of skill in the art, the following definitions are nevertheless put forth to aid in the understanding of the present disclosure. It should be understood, however, that when not explicitly defined, terms should be interpreted as adopting a meaning presently accepted by those of skill in the art.

"Alkali metal," as defined herein, refers to metallic elements and their ions found in Group 1 of the periodic table.

"Alkaline metal," as defined herein, refers to metallic elements and their ions found in Group 2 of the periodic table.

"Alkoxide," as defined herein, refers to any organic substituent bonded to an oxygen bearing a negative charge, wherein the oxygen bearing the negative charge is the conjugate base of an alcohol. The alkoxide may be formed through deprotonation of a hydroxyl group by a base. Encompassed within the term are alkoxides of polyols, which may have one oxygen bearing a negative charge or more than one oxygen bearing a negative charge.

"Carbohydrate," as defined herein, is a class of molecules comprising starches, cellulose, glycogen, sugars, and derivatives or analogs thereof. Sugars may be further classified as monosaccharides, disaccharides, trisaccharides, tetrasaccharides, oligosaccharides and polysaccharides. "Monosaccharides," as defined herein, comprise one naturally or non-naturally occurring sugar and derivatives or analogs thereof. "Disaccharides," as defined herein, comprise two monosaccharides linked together in any manner, wherein the monosaccharides may independently be naturally or non-naturally occurring sugars and derivatives or analogs thereof. Disaccharides may be naturally or non-naturally occurring. "Trisaccharides," as defined herein, comprise three monosaccharides linked together in any manner, wherein the monosaccharides may independently be naturally or non-naturally occurring sugars and derivatives or analogs thereof. Trisaccharides may be naturally or non-naturally occurring. "Tetrasaccharides," as defined herein, comprise four monosaccharides linked together in any manner, wherein the monosaccharides may independently be naturally or non-naturally occurring sugars and derivatives or analogs thereof. Tetrasaccharides may be naturally or non-naturally occurring. "Oligosaccharides and polysaccharides," as defined herein, comprise five or more monosaccharides linked together in any manner, wherein the monosaccharides may independently be naturally or non-naturally occurring sugars and derivatives or analogs thereof. Oligosaccharides and polysaccharides may be naturally or non-naturally occurring. Sugar alcohols and sugar acids are further included under the broad term carbohydrate.

"Polyol," as defined herein, is a polyfunctional alcohol compound having more than three hydroxyl moieties. Polyols may be naturally or non-naturally occurring compounds and derivatives or analogs thereof.

The present disclosure provides a method for conferring water solubility to carbon nanostructures. In embodiments of the disclosure, the water soluble carbon nanostructures are derived from sources including, but not limited to, fluorinated single-wall carbon nanotubes (F—SWCNT), fluorinated carbon nano-onions (F—CNO), and fluorinated nanodiamond (F—ND). The one step method disclosed herein may be used to provide water-soluble carbon nanostructures in isolable quantities. The method of making a water soluble carbon nanostructure comprises treating a fluorinated carbon nanostructure material with a polyol in the presence of a base. The method results in a covalent bond between the fluorinated carbon nanostructure material and the polyol.

The fluorinated carbon nanostructure material comprising the water soluble carbon nanostructures of the method disclosed herein may be a component selected from the group of fluorinated carbon nanostructure materials including, but not limited to, fluorinated single-wall carbon nanotubes, fluorinated double-wall carbon nanotubes, fluorinated multi-wall carbon nanotubes, fluorinated fullerenes, fluorinated carbon nano-onions, and fluorinated nanodiamond. One skilled in the art will recognize that any carbon nanostructure material that may be fluorinated may serve as a substrate in any of the methods disclosed herein.

The polyol of the present disclosure may be a carbohydrate structure in one embodiment, an oligomeric polyol in another embodiment, or a polymeric polyol in still another embodiment. An example polymeric polyol may include, but is not limited to, polyvinyl alcohol. The polyol may be a sugar alcohol or sugar acid. Representative sugar alcohols may include, but are not limited to, glycerol, arabitol, erythritol, fucitol, iditol, isomalt, lacitol, maltitol, mannitol, ribitol, sorbitol, threitol, volemitol, and xylitol. Representative sugar acids may include, but are not limited to, ascorbic acid and glucuronic acid. Carbohydrate structures that may be suitable to practice the method disclosed herein may include monosaccharides, disaccharides, trisaccharides, tetrasaccharides, oligosaccharides and polysaccharides. Monosaccharide carbohydrate structures may include, but are not limited to, glyceraldehyde, dihydroxyacetone, erythrose, threose, erythrulose, arabinose, lyxose, ribose, deoxyribose, xylose, ribulose, xylulose, allose, altrose, galactose, glucose, gulose, idose, mannose, talose, fucose, rhamnose, fructose, psicose, sorbose, tagatose, mannoheptulose, sedoheptulose, octolose, and sialose. Disaccharide carbohydrate structures may include, but are not limited to, sucrose, lactose, maltose, trehalose, cellobiose, gentiobiose, isomaltose, kojibiose, laminaribose, mannobiose, melibiose, nigerose, rutinose, xylobiose, and any other naturally or non-naturally occurring combination of two monosaccharide carbohydrate structures. Trisaccharide carbohydrate structures may include, but are not limited to, acarbose, raffinose, melezitose, maltotriose, and any other naturally or non-naturally occurring combination of three monosaccharide carbohydrate structures. Tetrasaccharide carbohydrate structures may include, but are not limited to, stachyose and any other naturally or non-naturally occurring combination of four monosaccharide carbohydrate structures. Polysaccharide and oligosaccharide carbohydrate structures may include, but are not limited to, glycogen, starch, cellulose, dextrins, and any other naturally or non-naturally occurring combination of greater than four monosaccharide carbohydrate structures. The polyol may also be a heterosaccharide, including but not limited to, pectin. Disaccharide, trisaccharide, tetrasaccharide, oligosaccharide and polysaccharide structures may also contain sugar alcohols or sugar acids within their structure. Selection of the carbohydrate structure comprising the polyol is conducted with the proviso that if the carbohydrate structure is a monosaccharide or a disaccharide, more than three hydroxyl moieties are present in the carbohydrate structure. An exemplary carbohydrate for practice of an embodiment of the method in the disclosure is sucrose, which has a solubility in water of 211.5 g/100 mL (20° C.). Advantages of sucrose for functionalization of carbon nanostructures may be improved water solubility and biocompatibility. One skilled in the art will recognize that the choice of carbohydrate structure for preparation of water soluble carbon nanostructures may depend on a number of factors, and any number of carbohydrate structures may be used to operate within the spirit and scope of the present disclosure.

Without being bound by mechanism, the method of the present disclosure uses a base to generate an alkoxide from the polyol. In an embodiment, the alkoxide comprises deprotonation of a hydroxyl group of the polyol. Deprotonation of more than one hydroxyl group of the polyol comprises the alkoxide in another embodiment. Any base that may generate an alkoxide is suitable for use in the method disclosed herein. In an embodiment of the method, the base comprises a hydroxide source. Hydroxide sources may include, but are not limited to, ammonium hydroxide, sodium hydroxide, potassium hydroxide, rubidium hydroxide, cesium hydroxide, tetraalkylammonium hydroxides, and lithium hydroxide. In an embodiment of the disclosure, the hydroxide source is lithium hydroxide. One skilled in the art will recognize that the properties of lithium hydroxide are advantageous for generating alkoxides in the present method. For example, formation of LiF during alkoxide displacement of fluorine from the fluorinated carbon nanostructure material provides a more exothermic driving force than other hydroxide counter ions such as sodium or potassium. Other bases that may be useful in practicing the disclosure may include, but are not limited to, alkaline metal hydroxides, alkali metal hydrides, alkaline metal hydrides, alkali metal alkyls, and alkaline metal alkyls. In an embodiment of the disclosure, an alkoxide may be generated by deprotonation of the 1' hydroxyl group of sucrose, and in other embodiments, alkoxides resulting from deprotonation of hydroxyl groups at other positions of sucrose are generated.

In another aspect, the present disclosure provides a water soluble carbon nanostructure comprising a fluorinated carbon nanostructure material and a polyol covalently bound to the fluorinated carbon nanostructure material. The water soluble carbon nanostructure may be made by the methods disclosed hereinabove from a fluorinated carbon nanostructure material, a polyol, and a base. The fluorinated carbon nanostructure material comprising the water soluble carbon nanostructure may be a component selected from the group of fluorinated carbon nanostructure materials consisting of fluorinated single-wall carbon nanotubes, fluorinated double-wall carbon nanotubes, fluorinated multi-wall carbon nanotubes, fluorinated fullerenes, fluorinated carbon nano-onions, and fluorinated nanodiamond. One skilled in the art will recognize that any carbon nano structure material that may be fluorinated may comprise the water soluble carbon nanostructure disclosed herein.

The polyol comprising the water soluble carbon nanostructure may be a carbohydrate structure in one embodiment, an oligomeric polyol in another embodiment, or a polymeric polyol in still another embodiment. An example of a polymeric polyol may include, but is not limited to, polyvinyl alcohol. The polyol may also be a sugar alcohol or sugar acid. Representative sugar alcohols may include, but are not limited to glycerol, arabitol, erythritol, fucitol, iditol, isomalt, lacitol, maltitol, mannitol, ribitol, sorbitol, threitol, volemitol, and xylitol. Representative sugar acids may include, but are not limited to, ascorbic acid and glucuronic acid. Carbohydrate structures comprising the water soluble carbon nanostructure disclosed herein may include monosaccharides, disaccharides, trisaccharides, tetrasaccharides, oligosaccharides, and polysaccharides. Monosaccharide carbohydrate structures may include, but are not limited to, glyceraldehyde, dihydroxyacetone, erythrose, threose, erythrulose, arabinose, lyxose, ribose, deoxyribose, xylose, ribulose, xylulose, allose, altrose, galactose, glucose, gulose, idose, mannose, talose, fucose, rhamnose, fructose, psicose, sorbose, tagatose, mannoheptulose, sedoheptulose, octolose, and sialose. Disaccharide carbohydrate structures may include, but are not limited to, sucrose, lactose, maltose, trehalose, cellobiose, gentiobiose, isomaltose, kojibiose, laminaribose, mannobiose, melibiose, nigerose, rutinose, xylobiose, and any other naturally or non-naturally occurring combination of two monosaccharide carbohydrate structures. Trisaccharide carbohydrate structures may include, but are not limited to, acarbose, raffinose, melezitose, maltotriose, and any other naturally or non-naturally occurring combination of three monosaccharide carbohydrate structures. Tetrasaccharide carbohydrate structures may include, but are not limited to, stachyose and any other naturally or non-naturally occurring combination of four monosaccharide carbohydrate structures. Polysaccharide and oligosaccharide carbohydrate structures may include, but are not limited to, glycogen, starch, cellulose, dextrins, and any other naturally or non-naturally occurring combination of greater than four monosaccharide carbohydrate structures. The polyol may also be a heterosaccharide, including but not limited to, pectin. Disaccharide, trisaccharide, tetrasaccharide, oligosaccharide and polysaccharide structures may also contain sugar alcohols or sugar acids within their structure. Selection of the carbohydrate structure comprising the polyol of the water soluble carbon nanostructure is conducted with the proviso that if the carbohydrate structure is a monosaccharide or a disaccharide, more than three hydroxyl moieties are present in the carbohydrate structure. An exemplary carbohydrate for comprising the water soluble carbon nanostructure disclosed herein is sucrose. Advantages of water soluble carbon nanostructures comprising sucrose may be enhanced water solubility and biocompatibility. One skilled in the art will recognize that the water soluble carbon nanostructure may be comprised by a number of different carbohydrate structures, any of which may be used to operate equivalently within the spirit and scope of the present disclosure.

In a further embodiment of the present disclosure, the water soluble carbon nanostructure may be reacted with a derivatizing agent. Derivatizing agents may include, but are not limited to, isocyanates, isothiocyanates, carboxylic acids, acyl halides, alkyl halides, carboxylic acid anhydrides, cyanogen halides, phosgene, thiophosgene, thionyl halides, phosphorus halides, sulfonyl halides, and epoxides Reaction with the derivatizing agent may be used to form a polymer precursor comprising the derivatized carbon nanostructure. Such structures may be used for forming polymer composites having carbon nanostructures directly bound to the polymer matrix. Polymer composites having carbon nanostructures having bound directly to the polymer matrix may demonstrate beneficial properties, such as improved mechanical strength, electrical conductivity, and impact resistance.

Water soluble carbon nano structures may be incorporated within a polymer matrix to form a polymer composite. Water soluble carbon nanostructures or a derivative or analog thereof may be mechanically dispersed within a polymer or copolymer material, in one embodiment. In another embodiment of the disclosure, a water soluble carbon nano structure or a derivative or analog thereof may be covalently bound to the polymer matrix. Water soluble carbon nanostructures may offer advantageous properties when incorporated into polymer composites, including but not limited to, interfacial interaction within and dispersion throughout the polymer matrix. Such composites may benefit from enhanced tensile strength, toughness, conductivity and the like. By way of non-limiting example, water soluble carbon nanostructures may be dispersed in or covalently bound to epoxy and phenolic resins. In some embodiments of the disclosure, the polymer composite comprises a carbon nanomaterial polymer precursor and a curing agent. The polymer composite formed from the carbon nanomaterial polymer precursor and curing agent may comprise an epoxy resin in an embodiment.

Water soluble carbon nanostructures may be advantageous for biomedical applications. In particular, the water soluble carbon nanostructures may be used as a drug delivery vehicle. Another biomedical use may be for biosensing applications. Other contemplated applications for the water soluble carbon nanostructures include, but are not limited to, use as surface coatings, gelling agents, heat management fluids and nanoscale abrasives. Additionally, such structures may be used in cements and ceramics for nanocomposite fabrication and in micro-/nano-electromechanical systems (MEMS/NEMS).

EXAMPLES

The following experimental examples are included to demonstrate particular aspects of the present disclosure. It should be appreciated by those of skill in the art that the methods described in the examples that follow merely represent exemplary embodiments of the disclosure. Those of skill in the art should, in light of the present disclosure, appreciate that many changes can be made in the specific embodiments described and still obtain a like or similar result without departing from the spirit and scope of the present disclosure.

The fluorinated carbon nanomaterial starting materials were obtained from the following sources or prepared by the following methods. Fluorinated single-wall carbon nanotubes obtained commercially from Carbon Nanotechnologies, Inc. (batch F-0219-1). AFM analysis demonstrated that the fluorinated single-wall carbon nanotubes had a length distribution from about 200 to about 700 nm and an average diameter of about 1.3 nm. Carbon nano-onions were fluorinated at about 350° C. as described previously (Y. Liu, R. L. Vander Wal, and V. N. Khabashesku, "Functionalization of carbon nano-onions by direct fluorination," *Chem. Mater.* 2007:19(4), pp. 778-786). The carbon nano-onion diameters ranged from about 30 to about 100 nm. Commercially available nanodiamond powder (Nanostructured and Amorphous Materials, Inc.) was fluorinated at about 310° C. as described previously (Y. Liu, Z. Gu, J. L. Margrave, and V. N. Khabashesku, "Functionalization of nanoscale diamond powder: fluoro-, alkyl-, amino-, and amino acid-nanodiamond derivatives," *Chem. Mater.* 2004:16, pp. 3924-3930). Prior to fluorination, the nanodiamond particle diameters were about 3.5 to about 6.5 nm.

Example 1

Synthesis

General procedure for functionalization of fluorinated carbon nanostructure materials with sucrose: The same general procedure was used for functionalization of all three types of fluorinated carbon nanostructures with sucrose. The fluorinated carbon nanostructures (50 mg) were dispersed in DMF by sonication using a 100 W bath sonicator for 90 minutes to obtain a suspension having a concentration of about 1 mg/mL. In a separate flask, equimolar amounts of lithium hydroxide and sucrose were dissolved in DMF and sonicated for 90 minutes to produce water and a lithium alkoxide of sucrose dispersed in DMF:

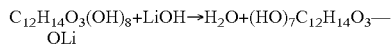

The contents of two flasks were thereafter mixed together and sonicated for another 90 minutes to produce the water soluble carbon nanostructure product:

A 5:1 molar ratio of sucrose/lithium hydroxide to fluorinated carbon nanostructure was used in the second step of the process. After the reaction, DMF was evaporated using a rotary evaporator at 50° C., and the sucrose functionalized carbon nanostructure was dispersed in a small amount of water. The sucrose functionalized carbon nanostructure was thereafter collected on 0.05 μm polycarbonate membrane, washed with water, and dried overnight under vacuum in a dessicator at room temperature. An alternative purification of sucrose functionalized single-wall carbon nanotubes and sucrose functionalized carbon nano-onions involved direct filtration of the DMF solution following sonication through a 0.2 μm Teflon membrane, followed by washing with water and drying overnight under vacuum in a dessicator at room temperature.

Example 2

Measurement of Solubility in Water

Sucrose functionalized carbon nanostructures demonstrated significantly improved solubility in water over the pristine starting carbon nanostructure materials. Quantitative estimation of the water solvation of sucrose functionalized SWCNT, sucrose functionalized carbon nano-onions, and sucrose functionalized nanodiamond was performed by dispersing 25 mg of sucrose functionalized carbon nanomaterial in 50 ml of selected solvents (water, ethanol and DMF) by sonicating for one hour. The dispersions were thereafter left undisturbed for 7 days. The top 40 ml of each solution was considered dissolved and decanted. The solids in the remaining solution were weighed after filtration and drying under vacuum overnight. FIG. 1 shows the water solutions obtained with sucrose functionalized carbon nanostructures (1010, 1020 and 1030) compared to the unfunctionalized carbon nanostructure starting materials (101, 102 and 103). 1010 is a solution of sucrose functionalized SWCNTs. 1020 is a solution of sucrose functionalized nanodiamond. 1030 is a solution of sucrose functionalized carbon nano-onions. The obtained solubility data are presented in Table 1.

TABLE 1

Solubility of sucrose functionalized SWCNT, CNO and ND in water, ethanol, and DMF.

| Type of nanostructure | Solvent | | |
|---|---|---|---|
| | Water | Ethanol | DMF |
| Sucrose-SWCNT | 100 mg/L | 110 mg/L | 140 mg/L |
| Sucrose-CNO | 200 mg/L | 220 mg/L | 400 mg/L |
| Sucrose-ND | 180 mg/L | 190 mg/L | 360 mg/L |

Example 3

Physical Characterization of Sucrose Functionalized Carbon Nanomaterials

All sucrose functionalized carbon nanostructures were characterized by several materials characterization methods, including FTIR, TGA-DTA, XPS, Raman, UV-VIS, SEM, TEM and AFM methods.

Figure 2:
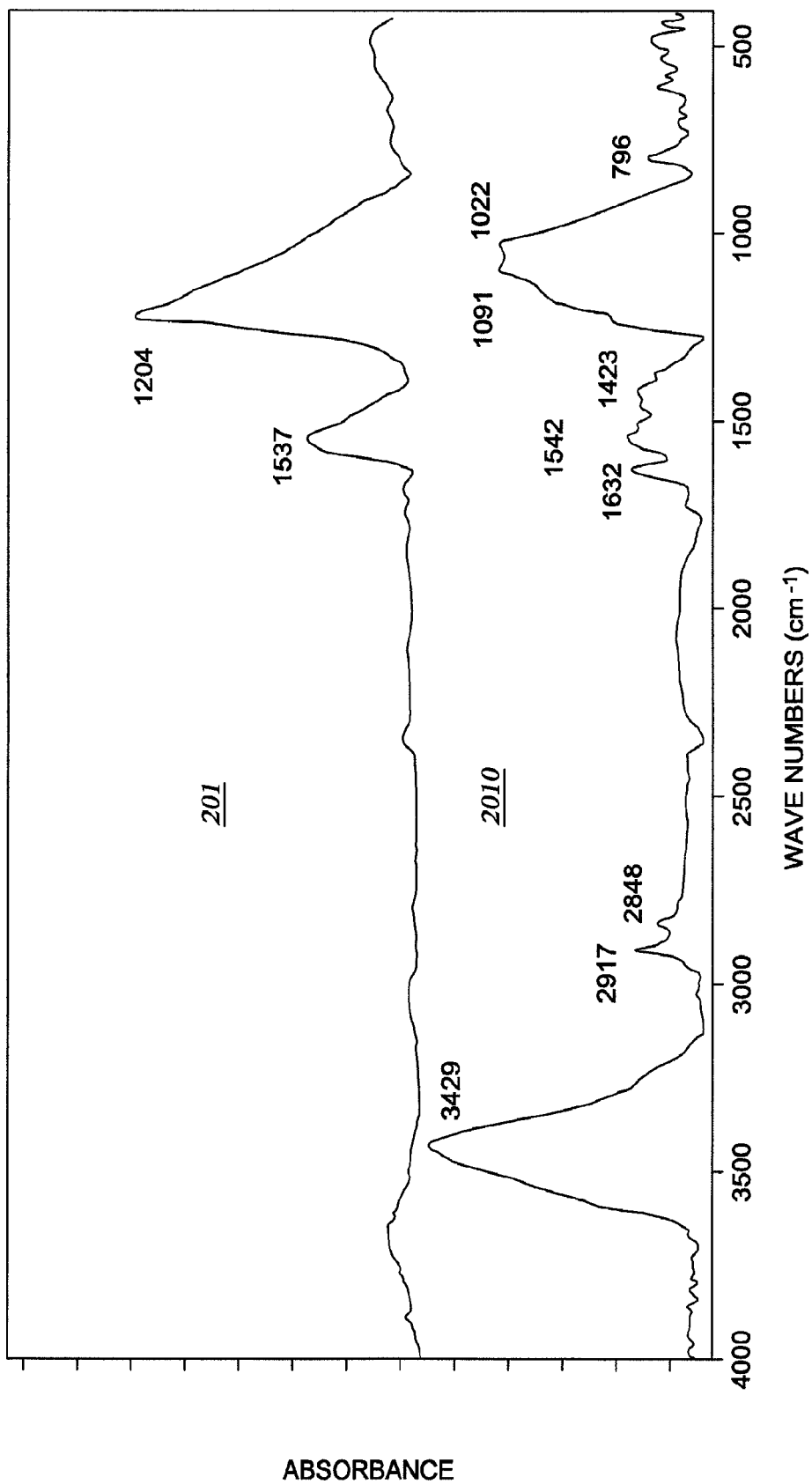
FIG. 2 shows the FTIR spectra of fluorinated SWCNTs and sucrose functionalized SWCNTs.

The FTIR spectra provide structural information on the functional groups present on the surface of carbon nanostructures before and after the derivatization reaction. FTIR spectra were obtained as KBr pellets. FIG. 2 displays the FTIR spectra of fluorinated SWCNTs (201) and sucrose functionalized SWCNTs (2010). In the spectrum of 201, the absorption band of the C—F stretch occurs at 1204 cm$^{-1}$, while the band of activated sidewall C=C stretches appears near 1537 cm$^{-1}$, in agreement with the IR characterization data on fluorinated HipCO SWCNTs. In the spectrum of 2010, the strong broad peak at 3429 cm$^{-1}$ corresponds to O—H stretches, and two peaks between 2800-3000 cm$^{-1}$ are due to the C—H stretches of the sucrose functional groups. The small peak at 1632 cm$^{-1}$ is most likely related to moisture absorbed on the hydrophilic surface of 2010. Peaks observed at 1542 cm$^{-1}$ and in the 1350-1460 cm$^{-1}$ region of 2010 are related to an activated sidewall C=C stretching and sucrose C—H bending motions, respectively. The shoulder peak near 1200 cm$^{-1}$ in 2010 is most likely due to the C—C stretches, while strong bands at 1091 and 1022 cm$^{-1}$ and a weaker band at 796 cm$^{-1}$ characterize the sucrose C—O stretching modes.

Figure 3:
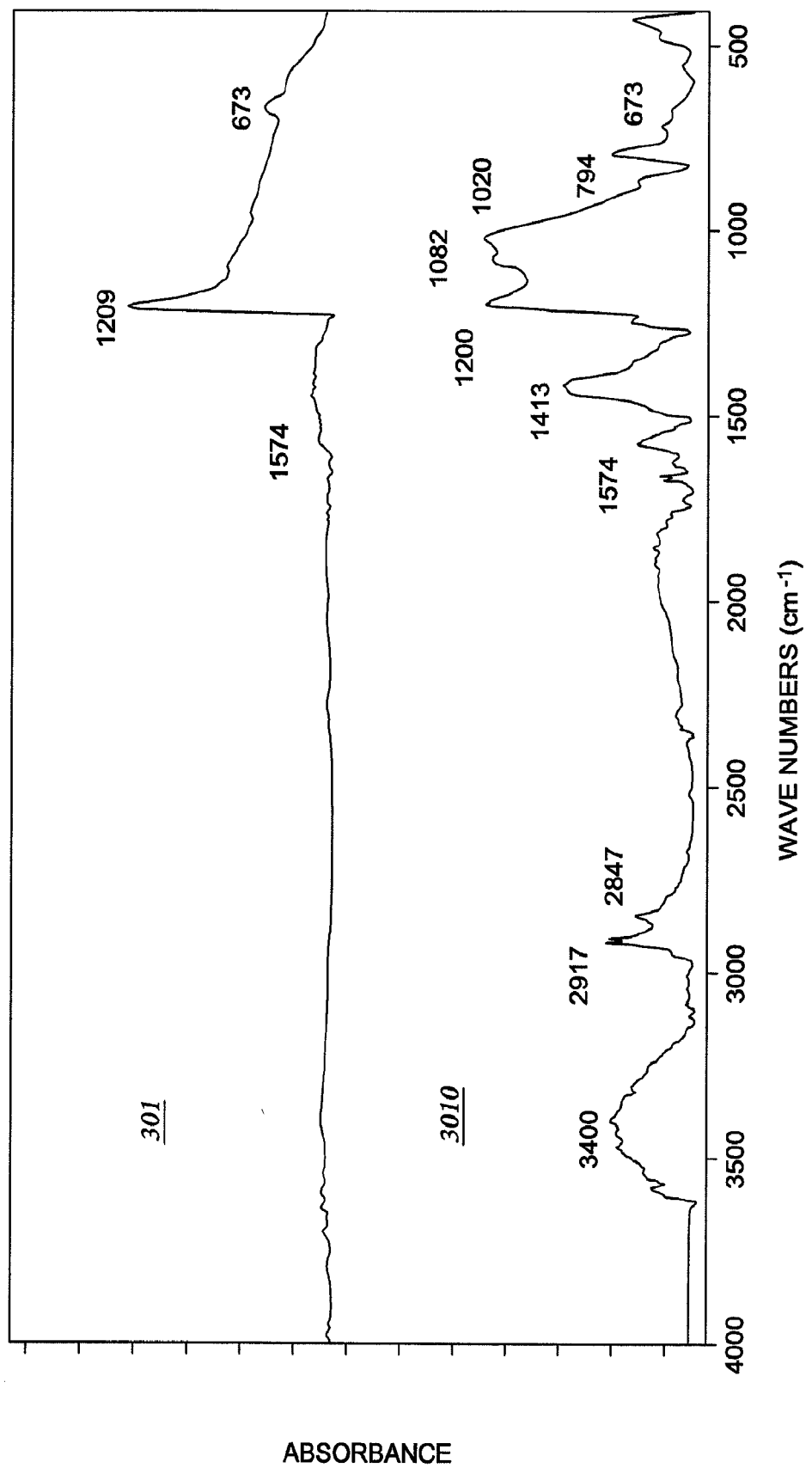
FIG. 3 shows the FTIR spectra of fluorinated carbon nano-onions and sucrose functionalized carbon nano-onions.

FIG. 3 shows the FTIR spectrum of fluorinated carbon nano-onions (301) and sucrose functionalized carbon nano-onions (3010). 301 shows a dominant peak at 1209 cm$^{-1}$ which belongs to the stretching vibrations of the tertiary C—F bonds formed by covalent addition of fluorine to graphite-like layers in the nano-onion 301. A very weak absorption observed in the spectrum at 1574 cm$^{-1}$ is assigned to the vibrational mode of the "fluoroolefinic" C=C bonds in the fluorinated carbon nano-onion, which become IR active due to breaking of the aromatic structure of the carbon nano-onion graphene layers through the addition of fluorine. The band of the C—F stretch weakens and shifts in the spectrum of sucrose functionalized carbon nano-onion 3010. Peaks characterizing the sucrose moieties appear at 3400 cm$^{-1}$ (O—H stretch), 2917 and 2847 cm$^{-1}$ (C—H stretch), 1413 cm$^{-1}$ (CH deformation) and in the 1200-900 cm$^{-1}$ range and at 794 cm$^{-1}$ (C—C and C—O stretches).

Figure 4:
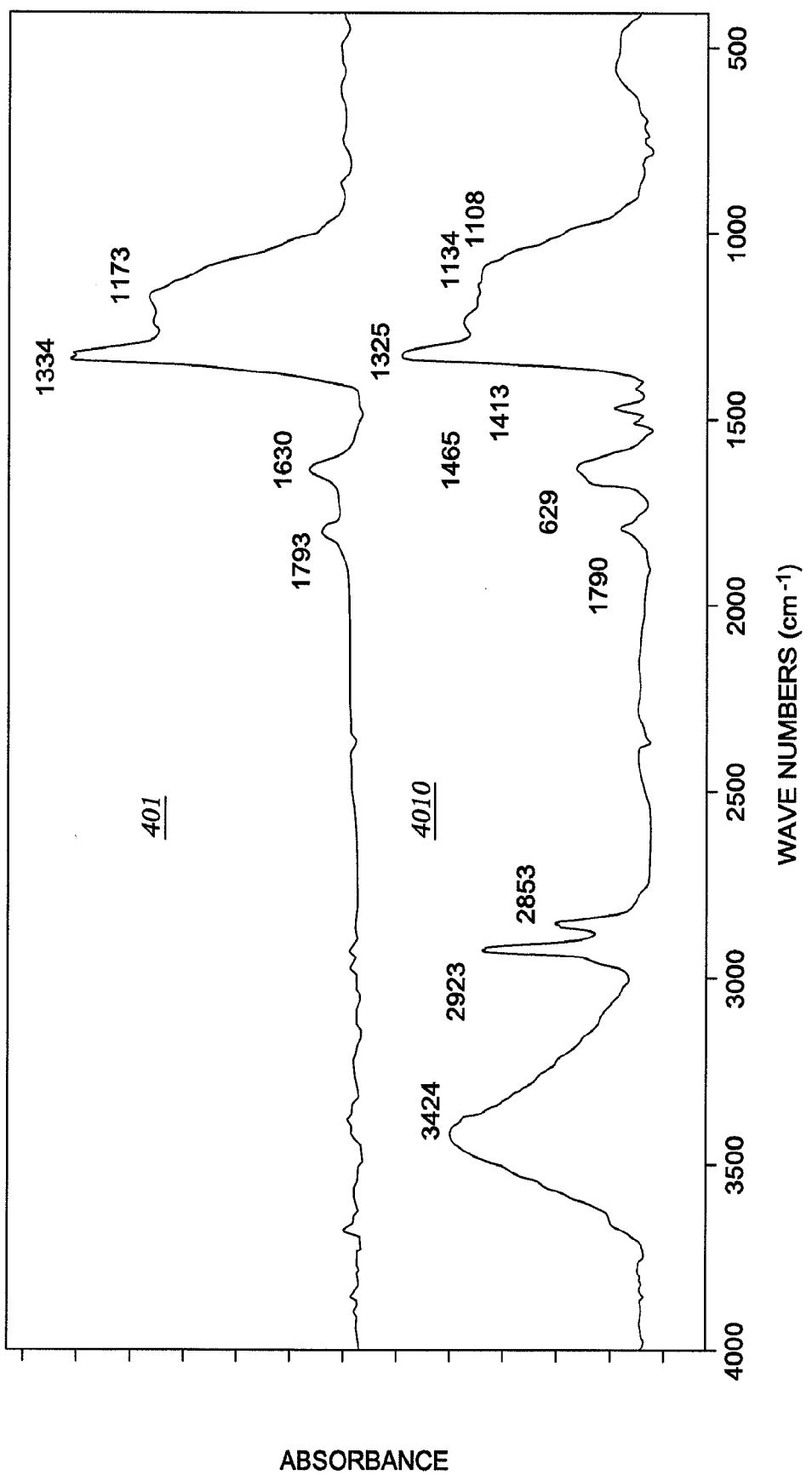
FIG. 4 shows the FTIR spectra of fluorinated nanodiamond and sucrose functionalized nanodiamond.

FIG. 4 shows the FTIR spectrum of fluorinated nanodiamond (401) and sucrose functionalized nanodiamond (4010). The C—F stretches in fluorinated nanodiamond appear in the 1100-1400 cm$^{-1}$ range, which are higher wavenumbers than in F—SWCNT and F—CNO, indicating a stronger C—F bonding at the nanodiamond surface. Very weak bands at 1798 and 1630 cm$^{-1}$ in 401 belong to residual surface C=O and C=C groups which remain virtually unchanged after transformation of F—ND into sucrose functionalized nanodiamond. The FTIR spectrum of sucrose functionalized nanodiamond 4010 shows the absorptions of sucrose O—H stretching vibrations at 3424 cm$^{-1}$, C—H stretches and deformation modes at 2923, 2853 cm$^{-1}$, and 1465, 1413 cm$^{-1}$, respectively, and C—C and C—O stretches in the 1250-950 cm$^{-1}$ region.

Figure 5:
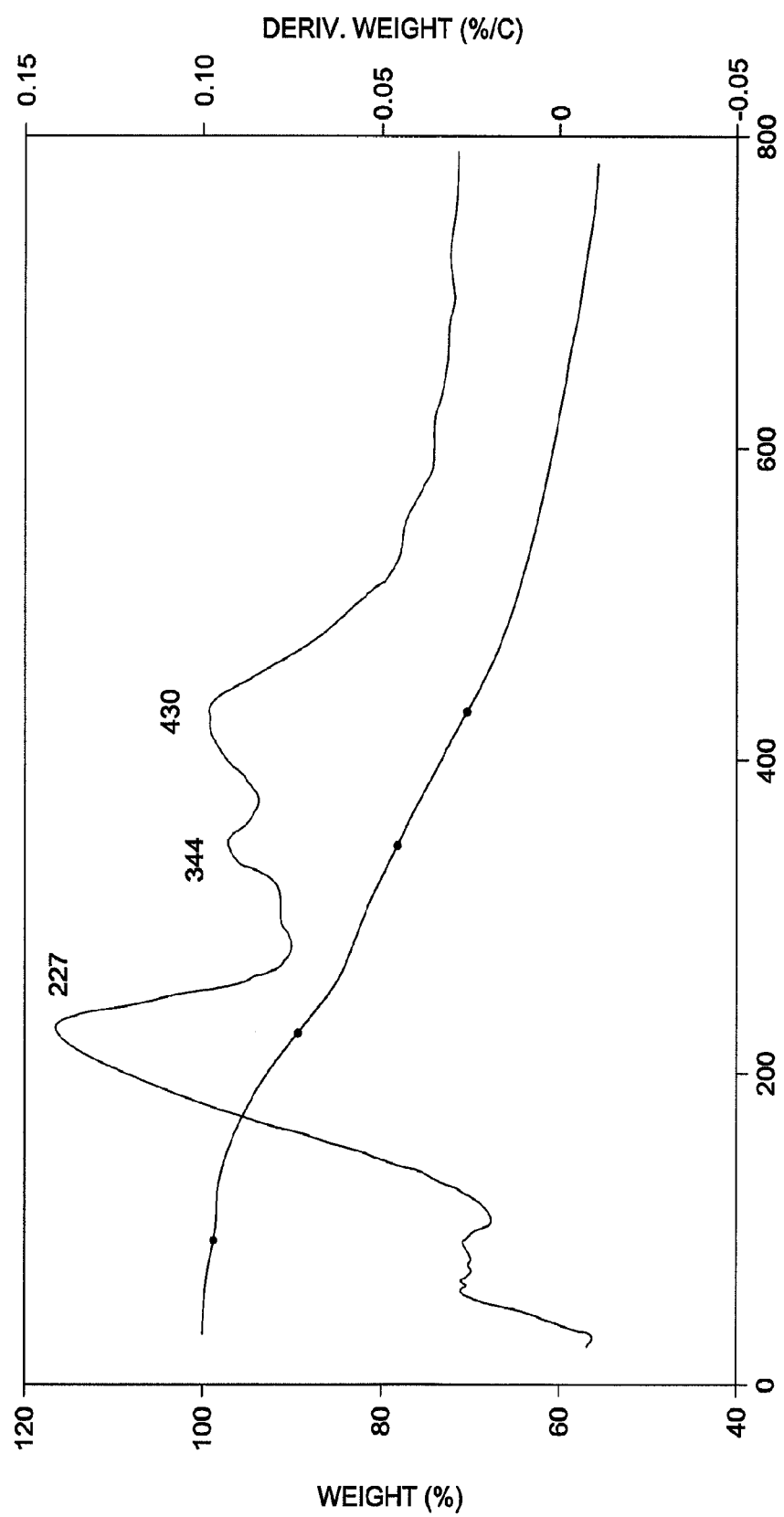
FIG. 5 shows the TGA-DTA plot for sucrose functionalized SWCNTs.
Figure 6:
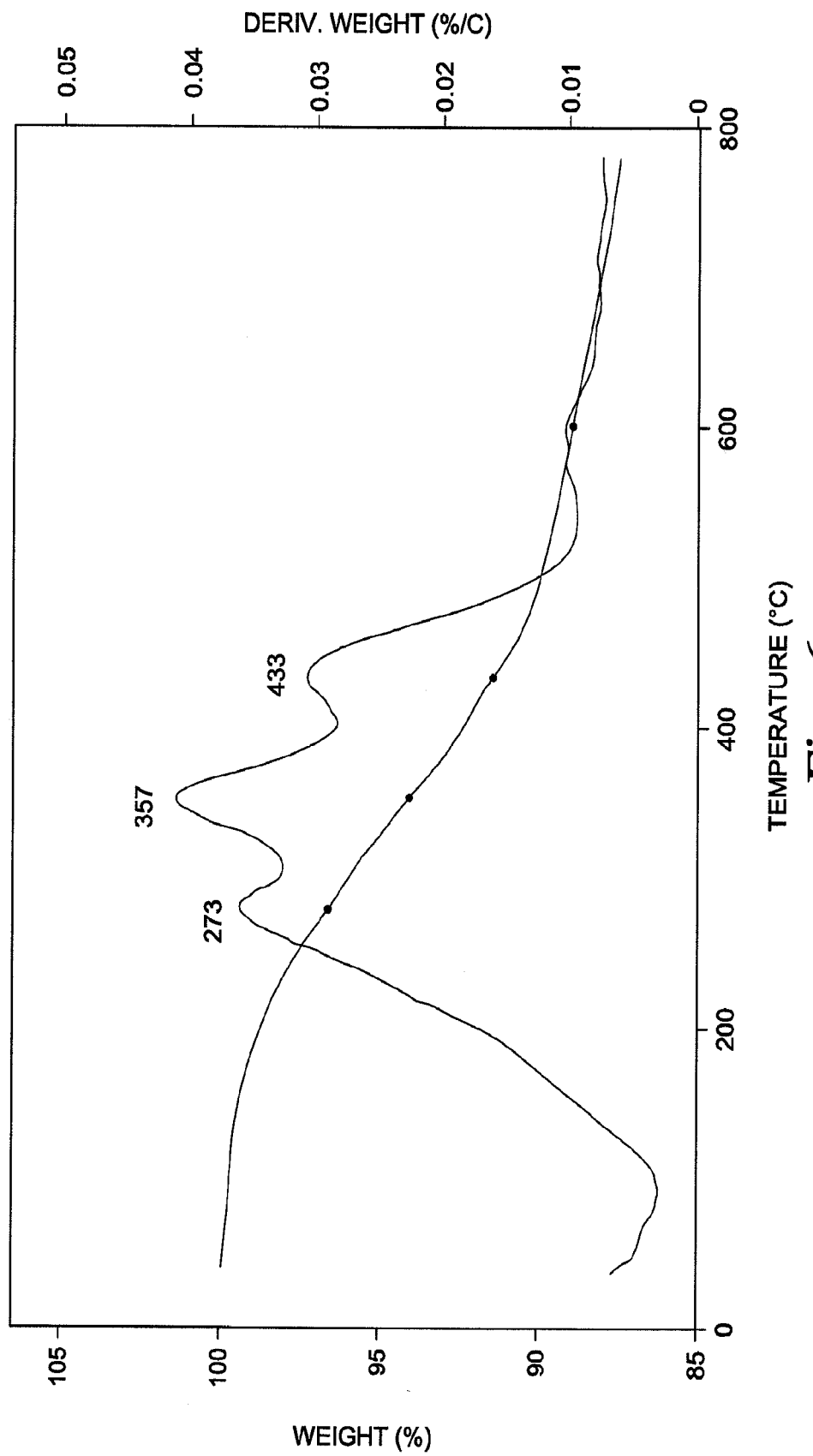
FIG. 6 shows the TGA-DTA plot for sucrose functionalized carbon nano-onions.
Figure 7:
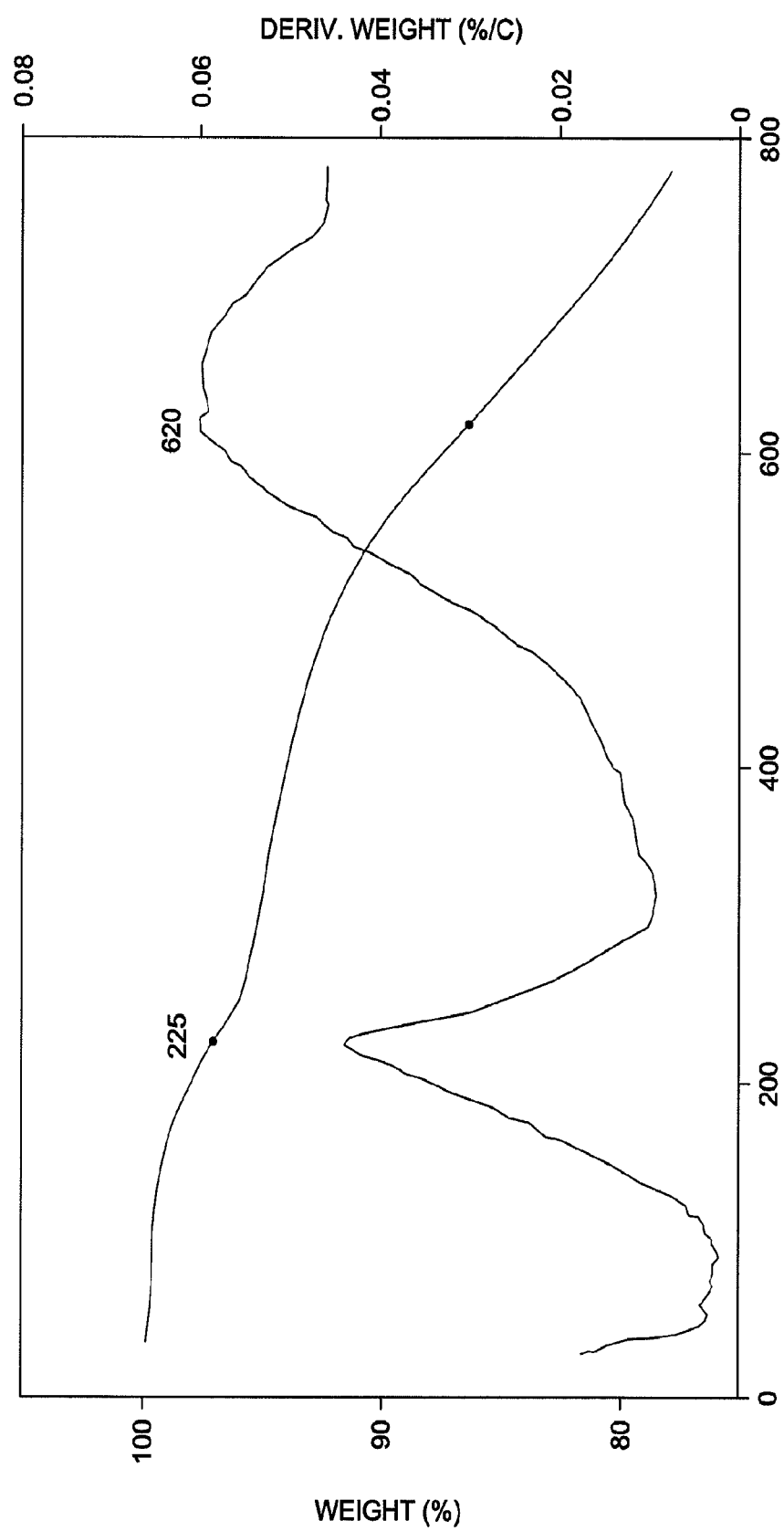
FIG. 7 shows the TGA-DTA plot for sucrose functionalized nanodiamond.

FIGS. 5-7 show the thermal gravimetric analysis (TGA) of sucrose functionalized SWCNTs (FIG. 5), sucrose functionalized carbon nano-onions (FIG. 6), and sucrose functionalized nanodiamond (FIG. 7). All three samples demonstrate weight loss at around 200-350° C. that indicates the detachment of sucrose from the surface of functionalized nanostructures followed by thermal degradation. The weight loss at temperatures above 500° C. is associated with removal of the residual fluorine from the surface of fluorinated and derivatized carbon nanostructures in the form of $CF_4$ (Y. Liu, R. L. Vander Wal, and V. N. Khabashesku, "Functionalization of Carbon Nano-onions by Direct Fluorination," Chem. Mater. 2007:19(4), pp. 778-786; Y. Liu, Z. Gu, J. L. Margrave, and V. N. Khabashesku, "Functionalization of nanoscale diamond powder: fluoro-, alkyl-, amino-, and amino acid-nanodiamond derivatives," Chem. Mater. 2004:16, pp. 3924-3930; V. N. Khabashesku, W. E. Billups, and J. L. Margrave, "Fluorination of Single-Wall Carbon Nanotubes and Subsequent Derivatization Reactions," Acc. Chem. Res. 2002:35, pp. 1087-1095). Sucrose functionalized SWCNTs exhibit the largest weight loss. This fact can be explained by the higher chemical reactivity of fluorinated nanotubes in comparison with the F—ND and F—CNO, and also by the fact that the internal carbon layers in the latter nanostructures remain intact and do not contribute to TGA weight loss. For SWCNTs the degree of functionalization by sucrose was calculated to be about 1 in 42 carbons. These studies present further verification that the carbon nano structures are modified by covalent derivatization of the carbon nanostructure surface.

Figure 8:
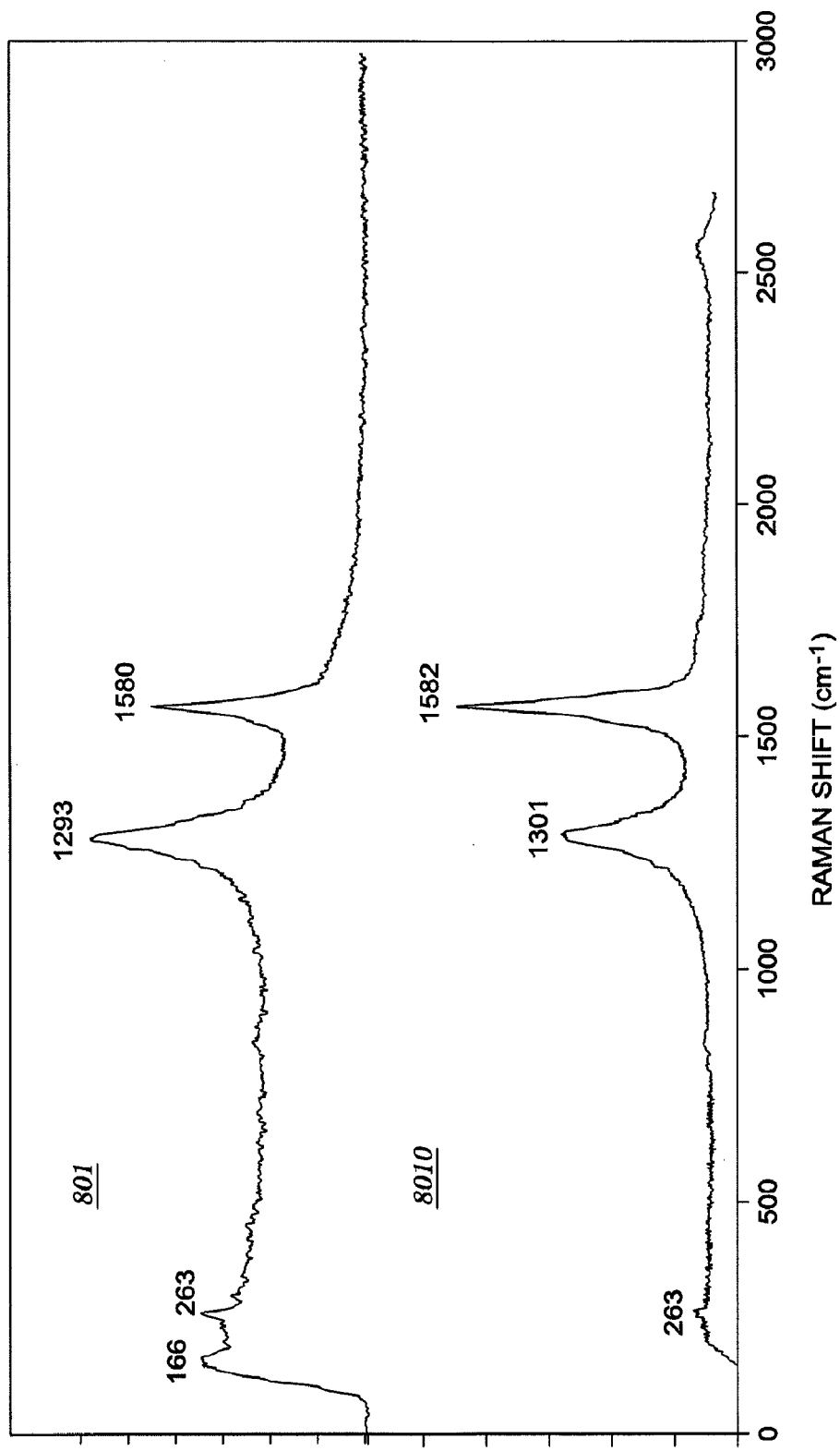
FIG. 8 shows Raman spectra of fluorinated SWCNTs and sucrose functionalized SWCNTs.

The Raman spectra of fluorinated SWCNTs 801 and sucrose functionalized SWCNTs 8010 shown in FIG. 8 provide evidence of sidewall functionalization of carbon nanotubes by showing a strong D-peak near 1300 $cm^{-1}$ due to $sp^3$ carbon-carbon bonds. FIG. 8 also shows that fluorine removal and substitution takes place during the reaction, resulting in bonding of sucrose molecules to the sidewalls. Evidence to this effect is reflected by the decrease in intensity and upshift of the D-peak from 1293 $cm^{-1}$ in 801 to 1301 $cm^{-1}$ in 8010, and upshift of the G-peak from 1580 $cm^{-1}$ in 801 to 1582 $cm^{-1}$ in 8010.

Figure 9A:
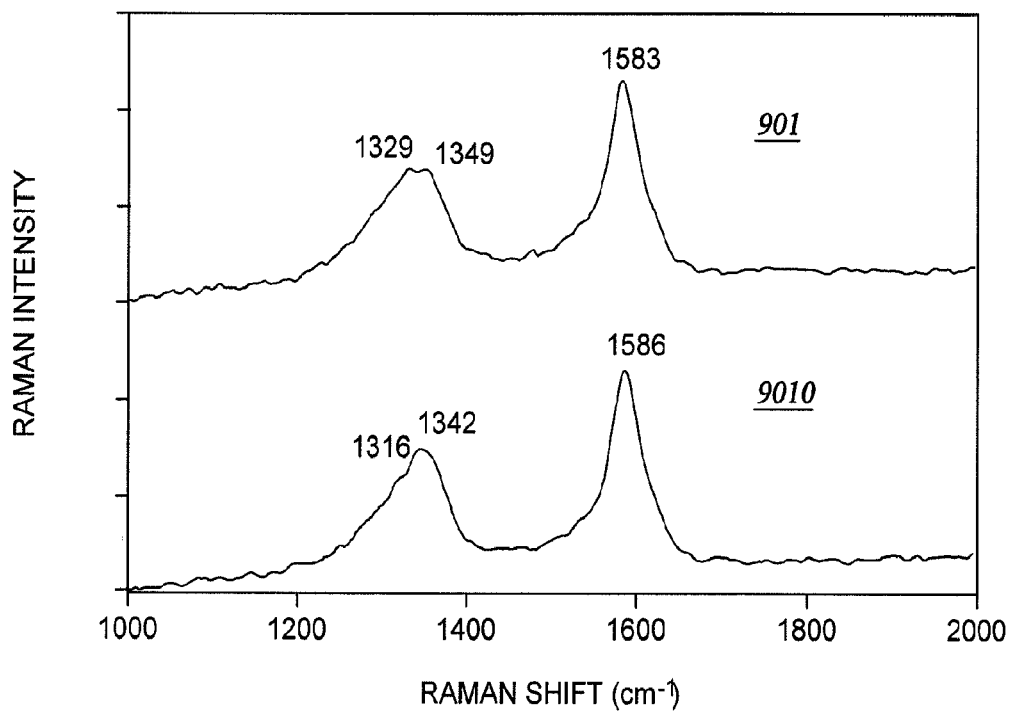
FIG. 9 shows Raman spectra of fluorinated carbon nano-onions, sucrose functionalized carbon nano-onions, fluorinated nanodiamond, and sucrose functionalized nanodiamond.
Figure 9B:
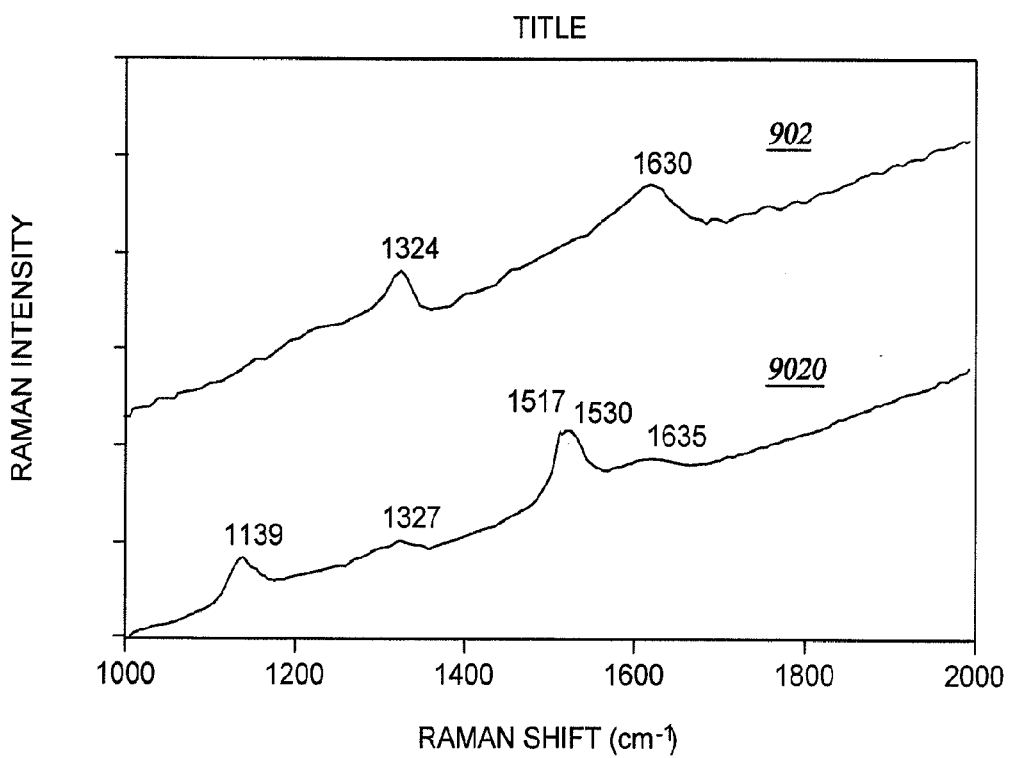

The Raman spectra of fluorinated carbon nano-onions 901, sucrose functionalized carbon nano-onions 9010, fluorinated nanodiamond 902 and sucrose functionalized nanodiamond 9020 are shown in FIG. 9. In contrast to the Raman spectrum of sucrose functionalized SWCNTs, the integrated D/G peak relative intensity in the Raman spectra of sucrose functionalized carbon nano-onions does not change significantly in comparison with the fluorinated carbon nano-onion starting material, except for slight upshifts of the peaks (901 and 9010). Since fluorinated carbon nano-onions are comprised by fluorographene multi-layers, the minor change observed in the Raman spectrum 9010 can be explained by the substitution of fluorine by sucrose taking place at the surface layer in the fluorinated carbon nano-onion, while internal fluorinated layers remain unchanged.

The Raman spectrum of fluorinated nanodiamond (902) has a spectrum similar to that of pristine nanocrystalline diamond (ND) powder. 902 demonstrates two broad peaks at 1324 and 1630 $cm^{-1}$ which are slightly shifted from the 1326 and 1625 $cm^{-1}$ peaks observed for ND. The first band is typical of nanosize diamond consisting of small atomic clusters of ordered $sp^3$-bonded carbon. The second band at 1625-1630 $cm^{-1}$ indicates the presence of weakly ordered clusters of $sp^2$-state carbons considered both as an impurity in the initial powder and partly as a constituent of the outer shells of nanoparticles creating bonded $sp^2/sp^3$ state carbons so that not only aromatic but also isolated C=C double bonds are present on ND and fluorinated surfaces. The Raman spectrum of sucrose functionalized nanodiamond (9020) shows two new stronger peaks at 1140 and 1537 $cm^{-1}$ in addition to weaker "nanodiamond" peaks at 1327 and 1635 $cm^{-1}$. These new peaks are not detected in the Raman spectra of sucrose functionalized SWCNTs or sucrose functionalized carbon nano-onions synthesized under the same conditions. These bands may be attributed to vibrations of HC=C—O units formed by partial degradation of sucrose units by LiOH during the DMF solvent removal step via rotary evaporation.

Figure 10:
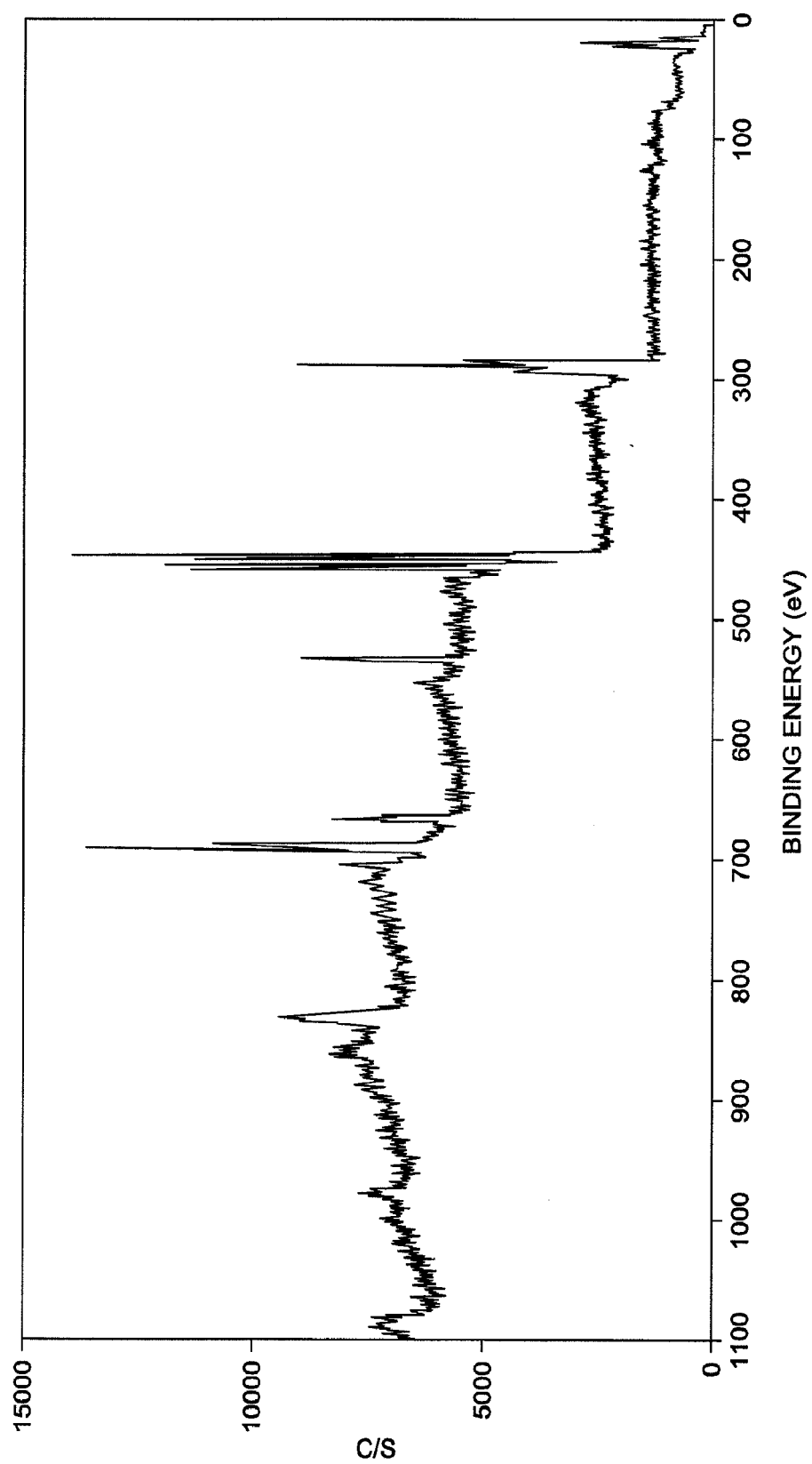
FIG. 10 shows an XPS survey scan of sucrose functionalized SWCNTs.
Figure 11:
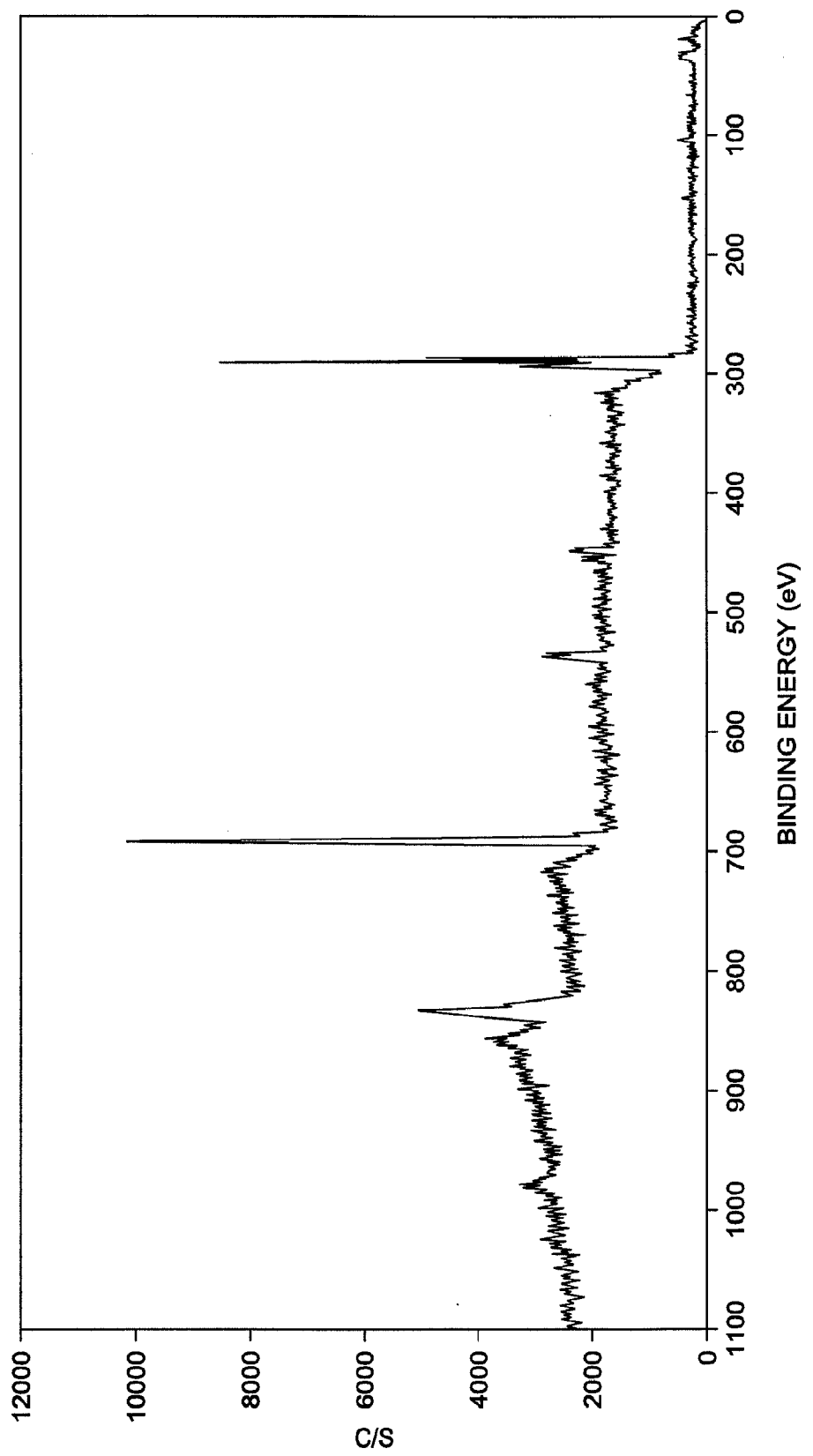
FIG. 11 shows an XPS survey scan of sucrose functionalized carbon nano-onions.
Figure 12:
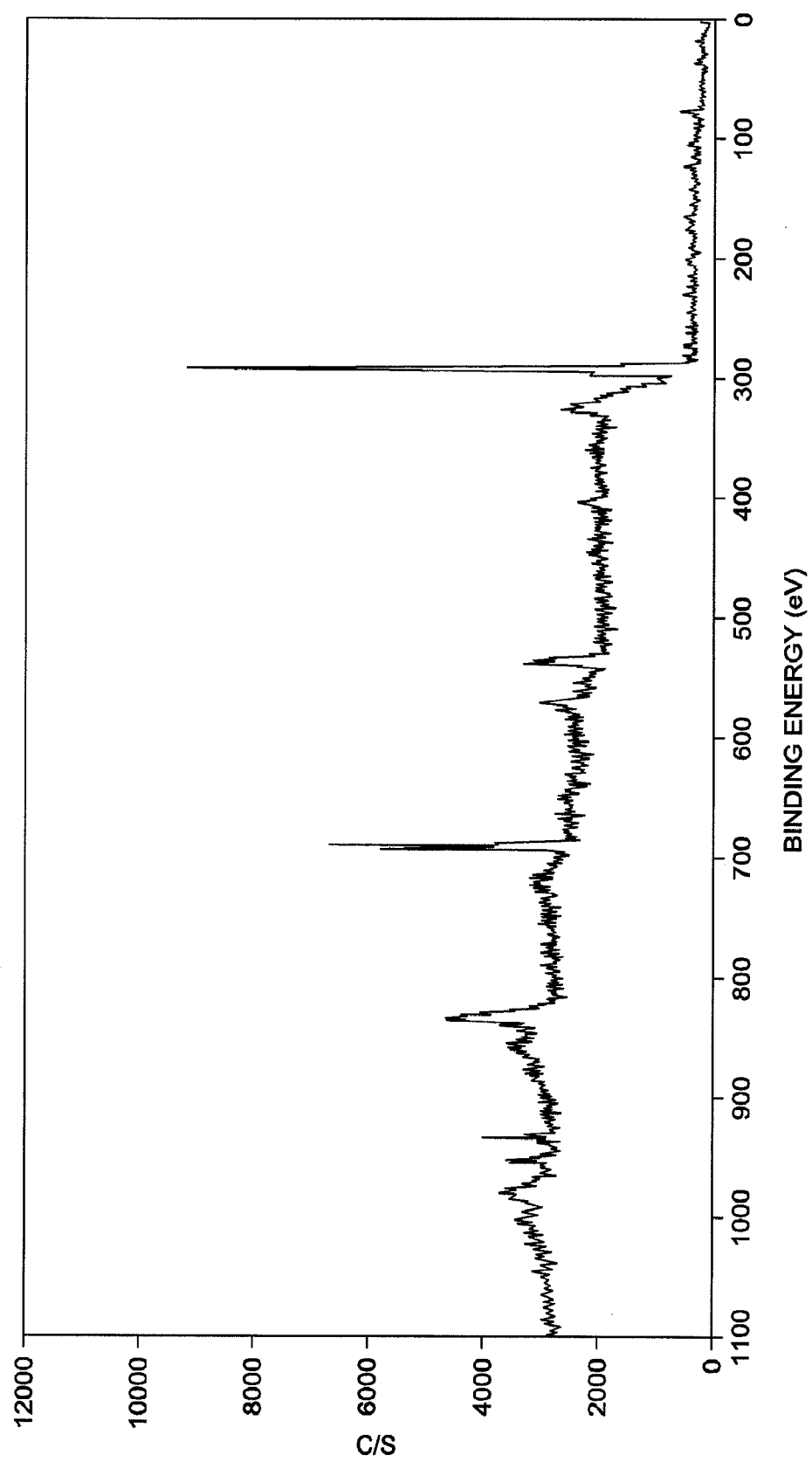
FIG. 12 shows an XPS survey scan of sucrose functionalized nanodiamond.

FIGS. 10-12 show the XPS survey scans of sucrose functionalized SWCNTs, sucrose functionalized carbon nano-onions, and sucrose functionalized nanodiamond. The results of XPS surface analysis, which usually provides sampling at only a few nanometers depth from the solid surface, showed carbon, fluorine and oxygen peaks for all samples. These data provide information on the extent of fluorine removal from F—SWCNT, F—NO, and F—ND both through displacement by sucrose and defluorination reactions. All fluorinated carbon nanostructures show reduced fluorine content after reactions with sucrose/lithium hydroxide in DMF. The most notable reduction in fluorine content occurred for sucrose functionalized SWCNT and sucrose functionalized carbon nano-onion derivatives (from 35.7 to 18.4 atomic % for sucrose functionalized SWCNTs and from 44.2 to 21.8 atomic % for sucrose functionalized carbon nano-onions). Sucrose functionalized nanodiamond showed a much smaller extent of fluorine content reduction (from 14.0 to 12.7 atomic %), indicating the lower reactivity of the C—F bond in fluorinated nanodiamond.

Figure 13:
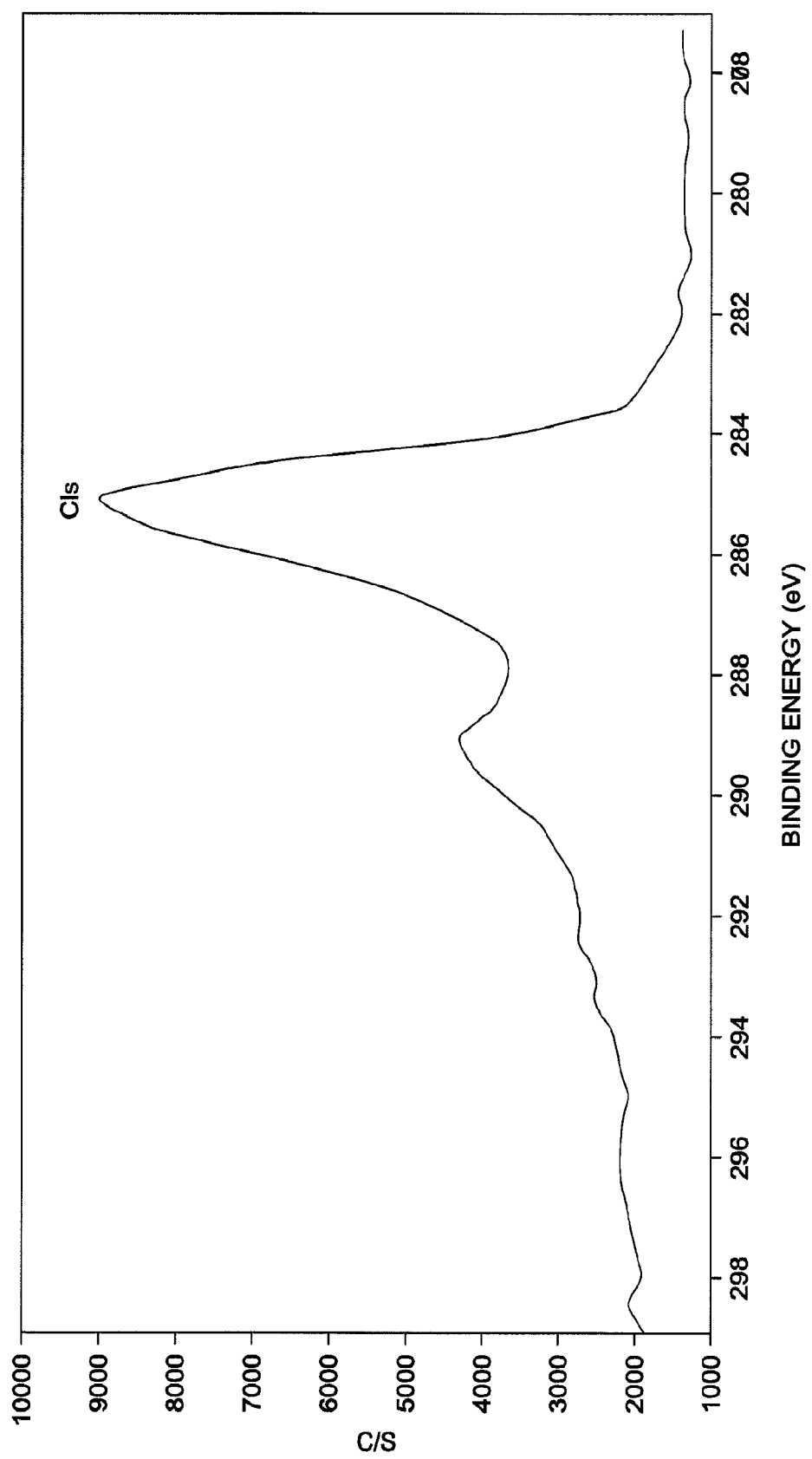
FIG. 13 shows the high resolution C1s XPS scan of sucrose functionalized SWCNTs.
Figure 14:
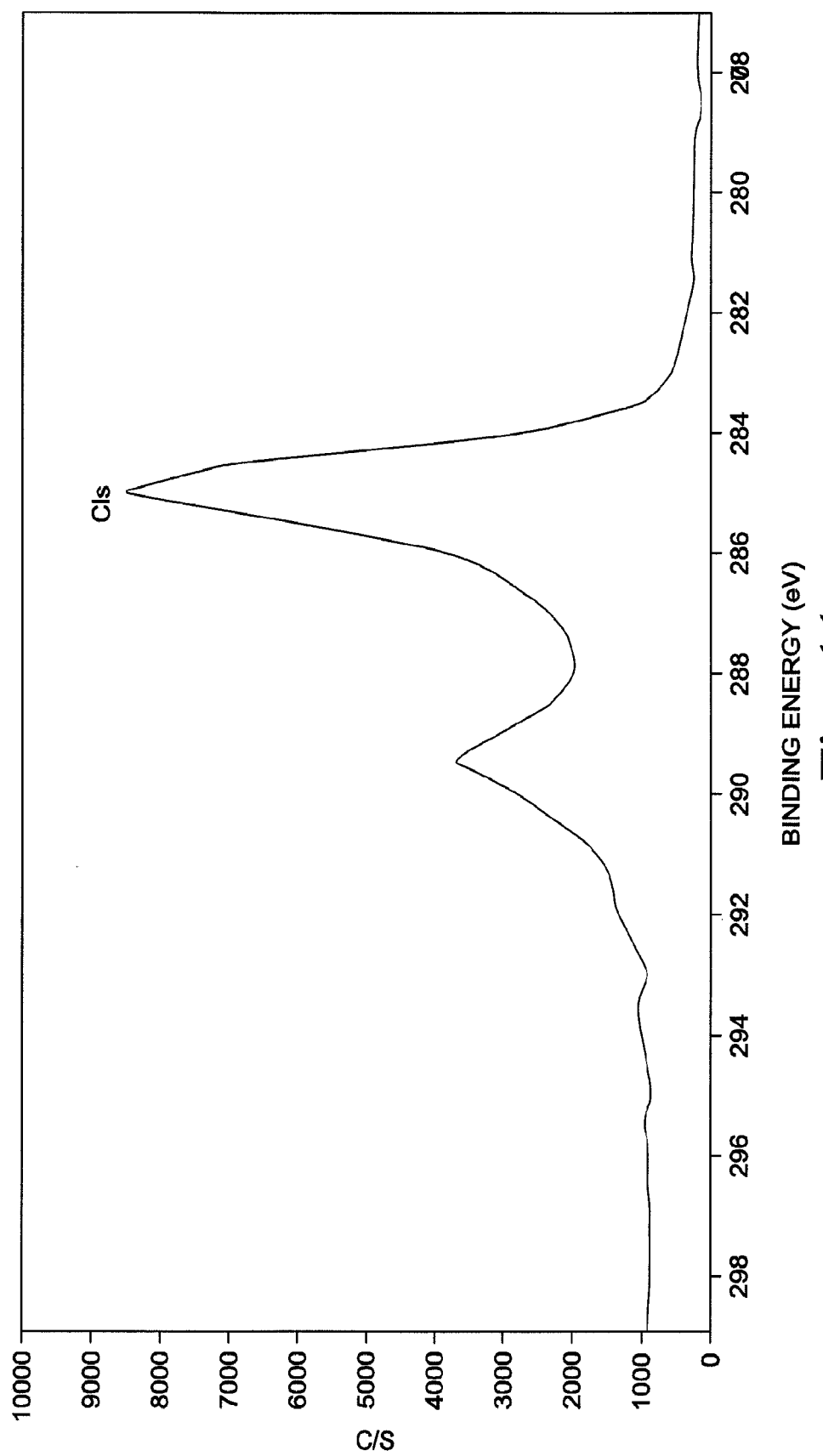
FIG. 14 shows the high resolution C1s XPS scan of sucrose functionalized carbon nano-onions.
Figure 15:
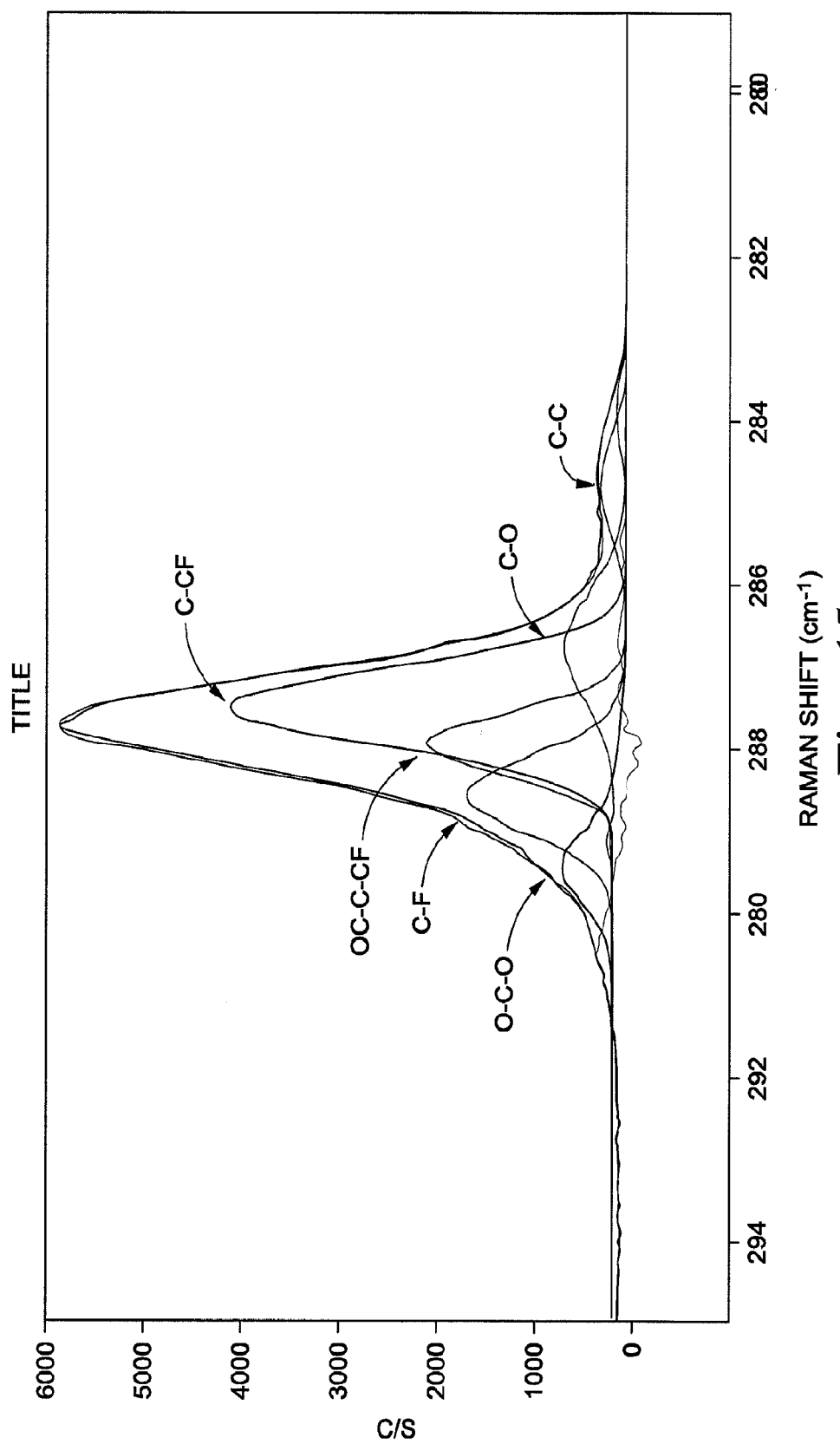
FIG. 15 shows the deconvoluted high resolution C1s XPS scan of sucrose functionalized nanodiamond.

The high-resolution XPS C1s spectra of functionalized graphene-type nanostructures, i.e., sucrose functionalized SWCNT (FIG. 13) and sucrose functionalized carbon nano-onions (FIG. 14), are quite similar, each showing deconvoluted peaks at 284.5, 285.0-285.1, 286.0-286.2, 287.6, and 289.0-289.3 eV due to the C=C, C—C, C—O, C—CF and C—F bonded carbons, respectively. Although the deconvoluted peaks in the high-resolution XPS C1s spectrum of sucrose functionalized nanodiamond (FIG. 15) appear at positions close to those in sucrose functionalized SWCNTs and sucrose functionalized carbon nano-onions, they show significantly different relative intensities. For instance, the deconvoluted peak at 284.2 eV shows very low intensity and possibly characterizes the $sp^2$ carbons from the C=C bonds formed during partial thermal degradation of sucrose groups during DMF solvent removal. The highest intensity peaks in this spectrum, at 287.4, 287.9, and 288.5 eV, are due to the $sp^3$ carbons located in different bonding environments, such as C—CF, OC—C—CF, and C—F, respectively. The lower intensity peaks at 285.0, 286.9 and 289.5 eV characterize the sucrose group carbons of the C—C, C—O and O—C—O units.

Figure 16A:
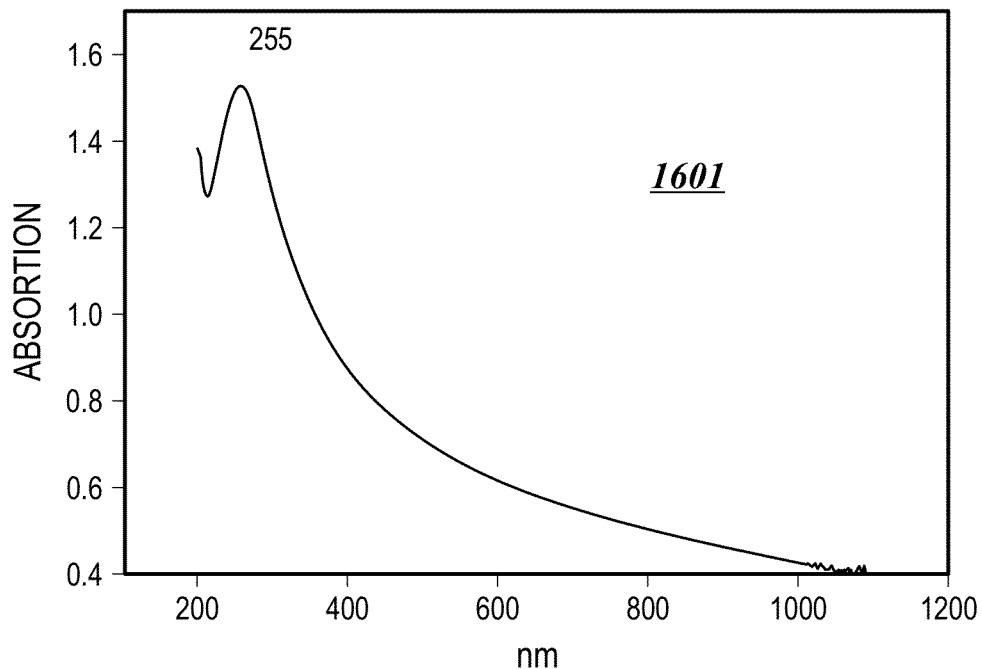
FIG. 16 shows the UV-VIS spectrum of sucrose functionalized SWCNTs, sucrose functionalized carbon nano-onions, and sucrose functionalized nanodiamond.
Figure 16B:
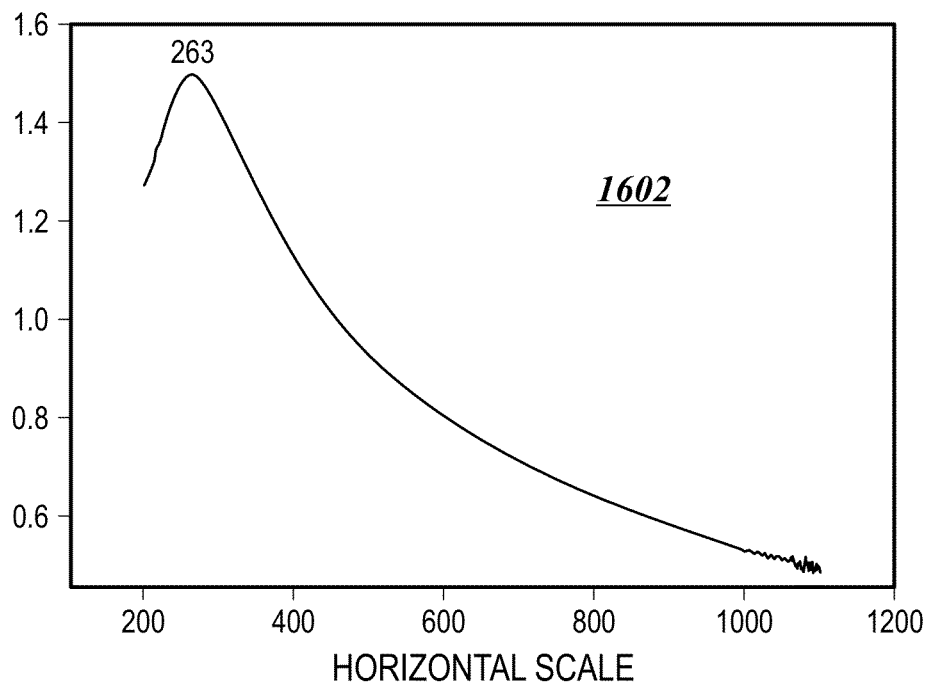
Figure 16D:
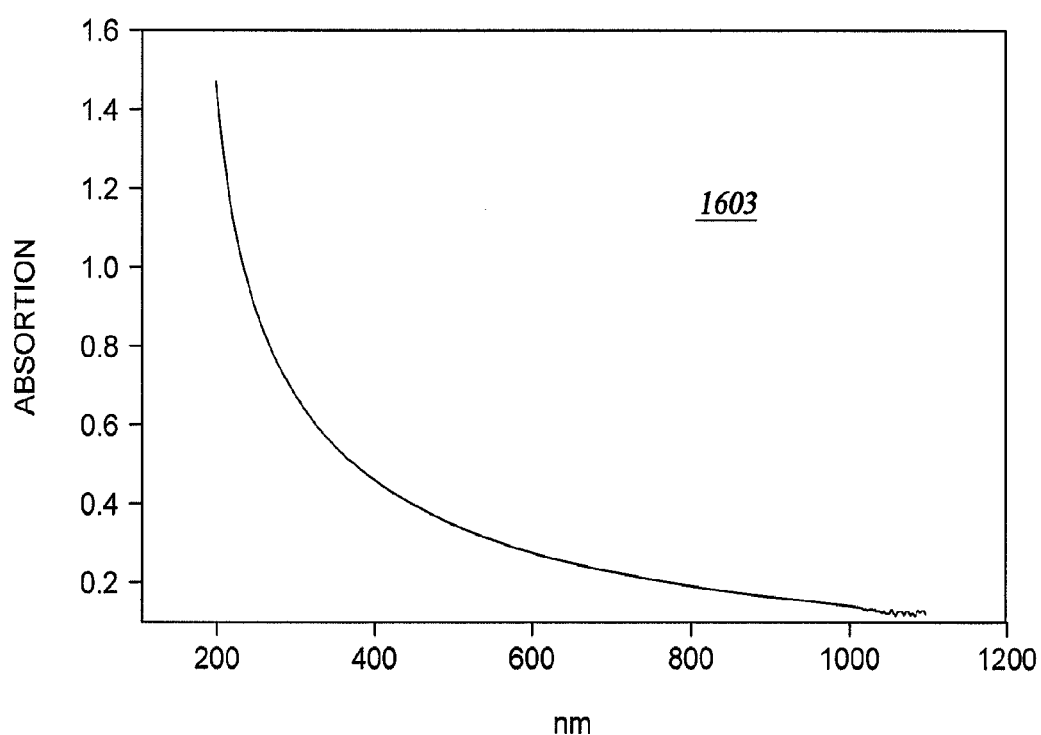
Figure 17A:
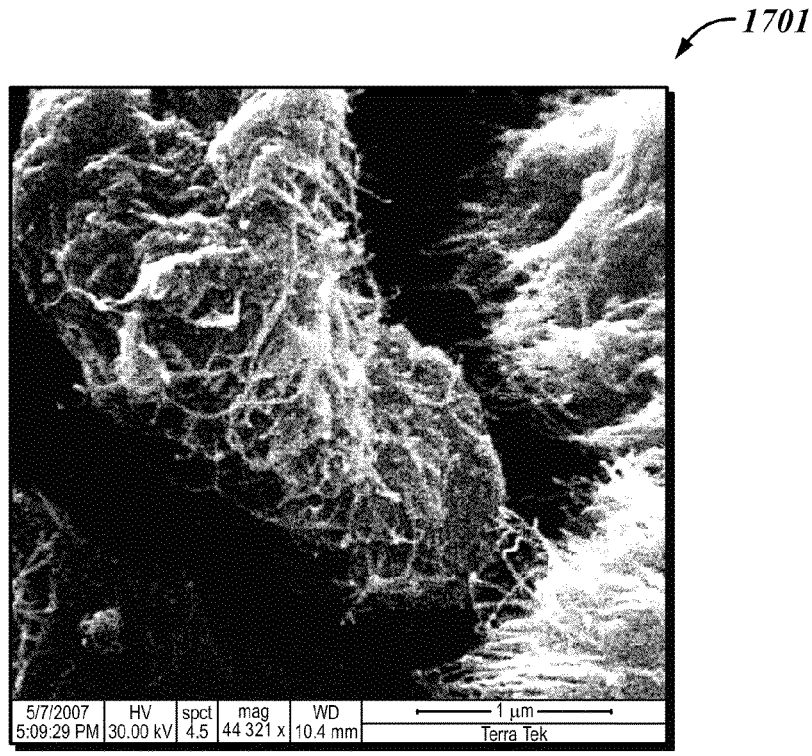
FIG. 17 shows microscopy images for sucrose functionalized SWCNTs.
Figure 17B:
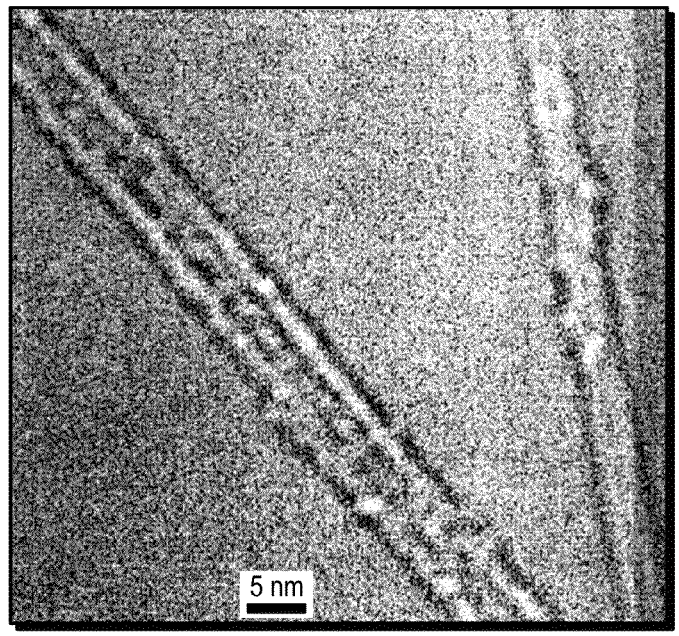
Figure 17C:
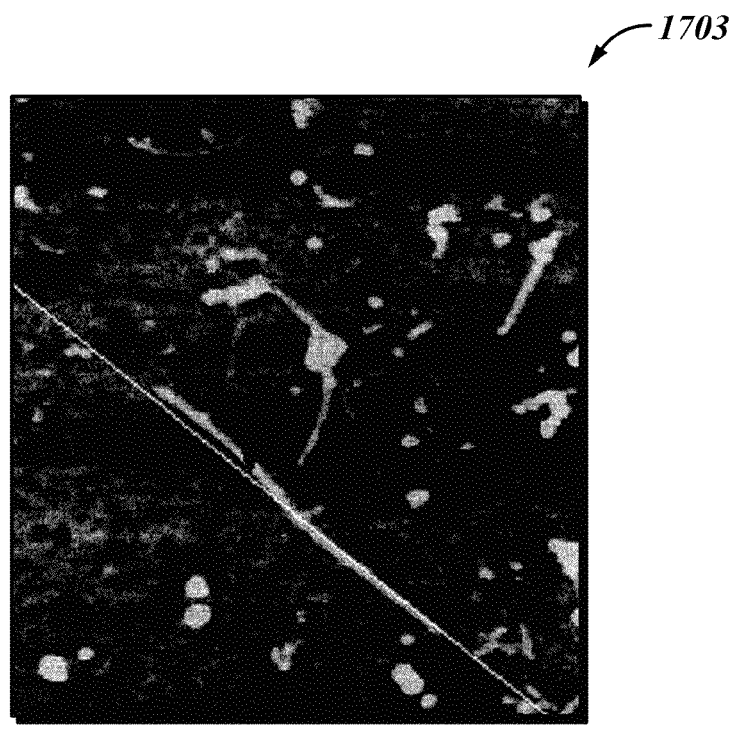
Figure 17D:
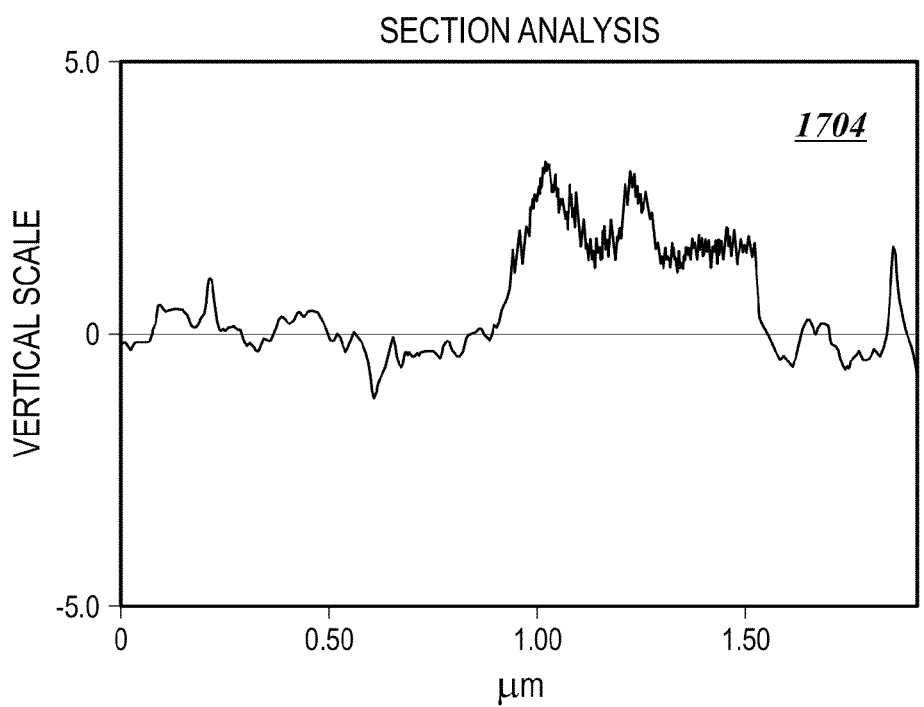

The solubility of sucrose functionalized carbon nanomaterials enables their characterization by UV-VIS spectroscopy as a probe for the effect of functionalization on surface electronic configuration. The UV-VIS spectra of sucrose functionalized SWCNTs (1601), sucrose functionalized carbon nano-onions (1602), and sucrose functionalized nanodiamond (1603) as water dispersions are shown in FIG. 16. In case of SWCNTs and carbon nano-onions, covalently bound fluorine and sucrose functional groups may transform the carbon nanomaterial surface from a π-bonded polyaromatic into a polyene structure. In contrast, for σ-bonded nanodiamond, a much smaller change is expected. The UV-VIS spectra of sucrose functionalized SWCNTs (1601) and sucrose functionalized carbon nano-onions (1602) show single absorption peaks at 255 and 263 nm, respectively, characteristic of a π-π* electron transition in the polyaromatic system of curved graphene layers. The absence of additional peaks in the 200-220 nm region, related to π-π* electron transitions for polyene-type structures, is most likely due to the extent of surface defluorination and restoration of aromatic structure rather than direct substitution of fluorine by sucrose. The UV-VIS spectrum of sucrose functionalized nanodiamond 1603 was clear of any absorption bands in the 200-1100 nm range, as expected for an $sp^3$ σ-bonded structure.

FIG. 17 shows microscopy images of sucrose functionalized SWCNTs. Image 1701 is an SEM image; image 1702 is a high resolution TEM image; and image 1703 is an AFM image. Combination of SEM, TEM and AFM may provide informative data in support of surface functionalization of SWCNTs. According to SEM image 1701 the surface morphology and extent of nanotube bundling of sucrose functionalized SWCNTs within bulk nanotube samples differ from pristine and fluorinated SWCNTs. The presence of sucrose on the SWCNT surface may facilitate aggregation through hydrogen bonding between hydroxyl groups. TEM image 1702 and AFM image 1703 provide direct evidence for covalent functionalization of SWCNTs. TEM image 1702 clearly shows a very thin bundle of sucrose functionalized SWCNTs which are surface-modified. The sucrose molecules attached to the nanotube sidewalls appear as buds or short twigs. The AFM image 1703 shows coating on the backbones of nanotubes. From cross-section height analysis 1704, the size of the nanotube with the sidewall-attached molecules was estimated to be about 2.573 nm. This value reasonably agrees with the sum of average F—SWCNT diameter (about 1.3 nm) and approximate size of a sucrose molecule (about 1.0 to 1.3 nm).

Example 4

Physical Characterization of Glucose Functionalized Carbon Nanomaterials

Figure 18:
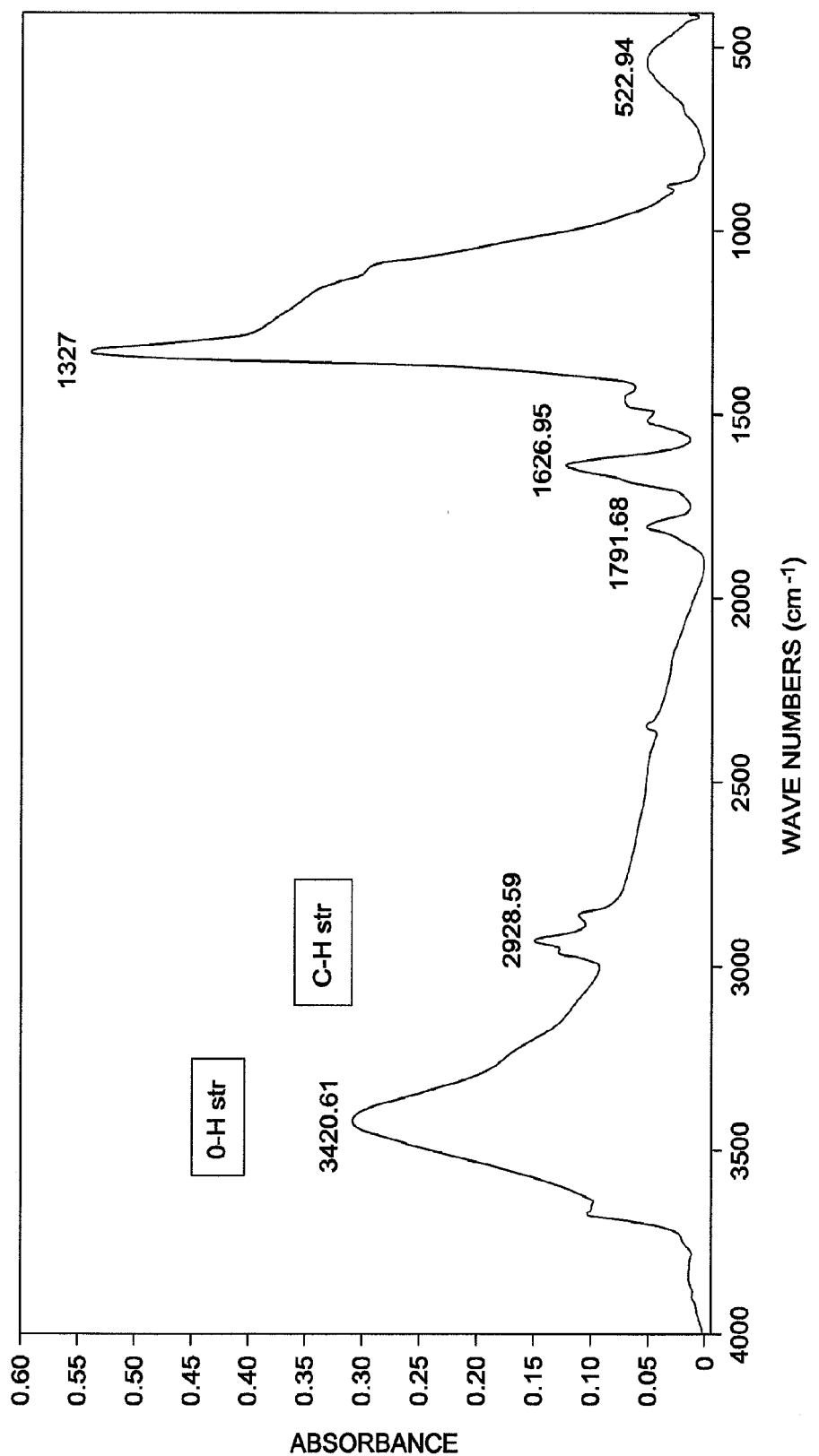
FIG. 18 shows the FTIR spectrum of glucose functionalized fluorinated nanodiamond.
Figure 19:
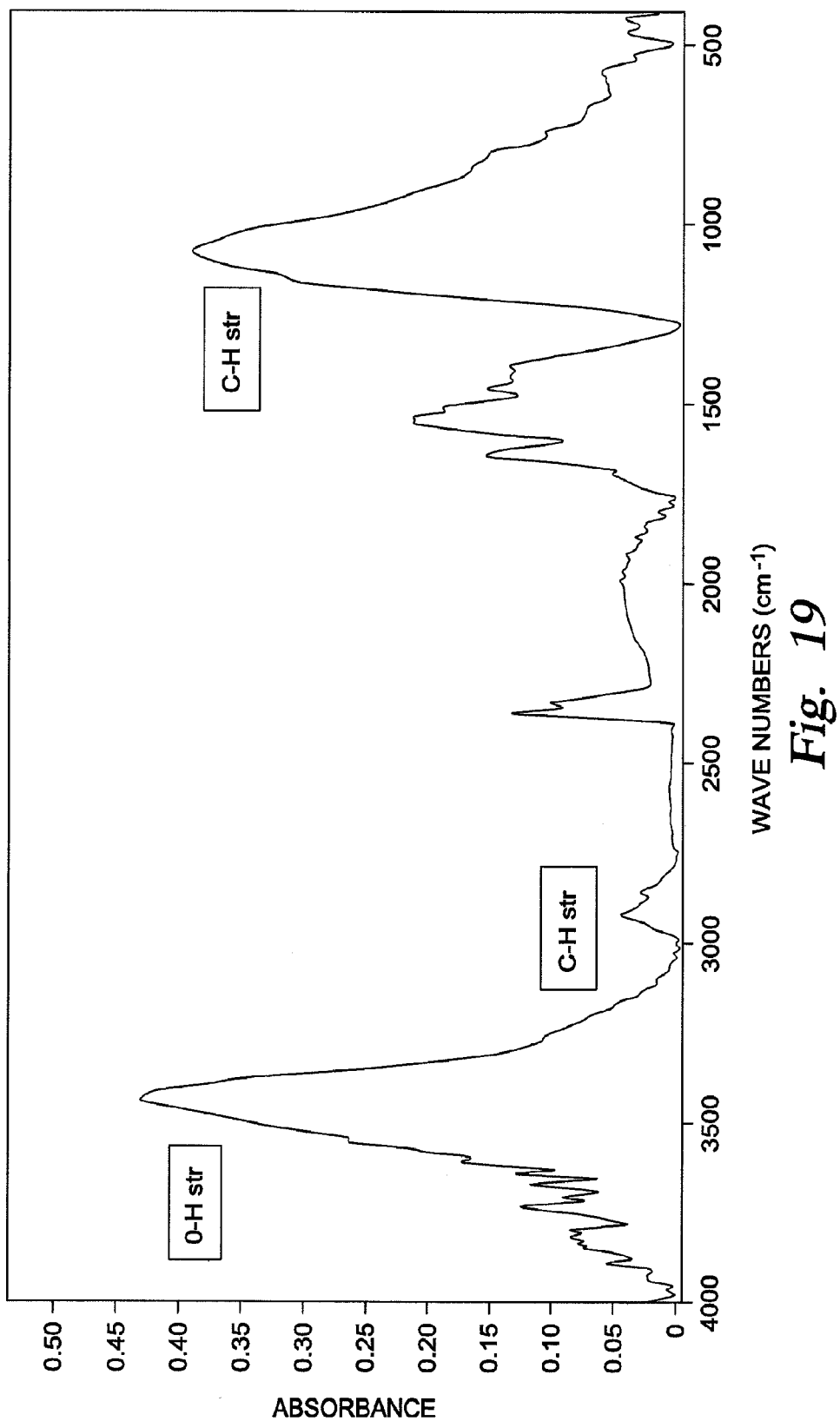
FIG. 19 shows the FTIR spectrum of glucose functionalized fluorinated SWCNTs.
Figure 20:
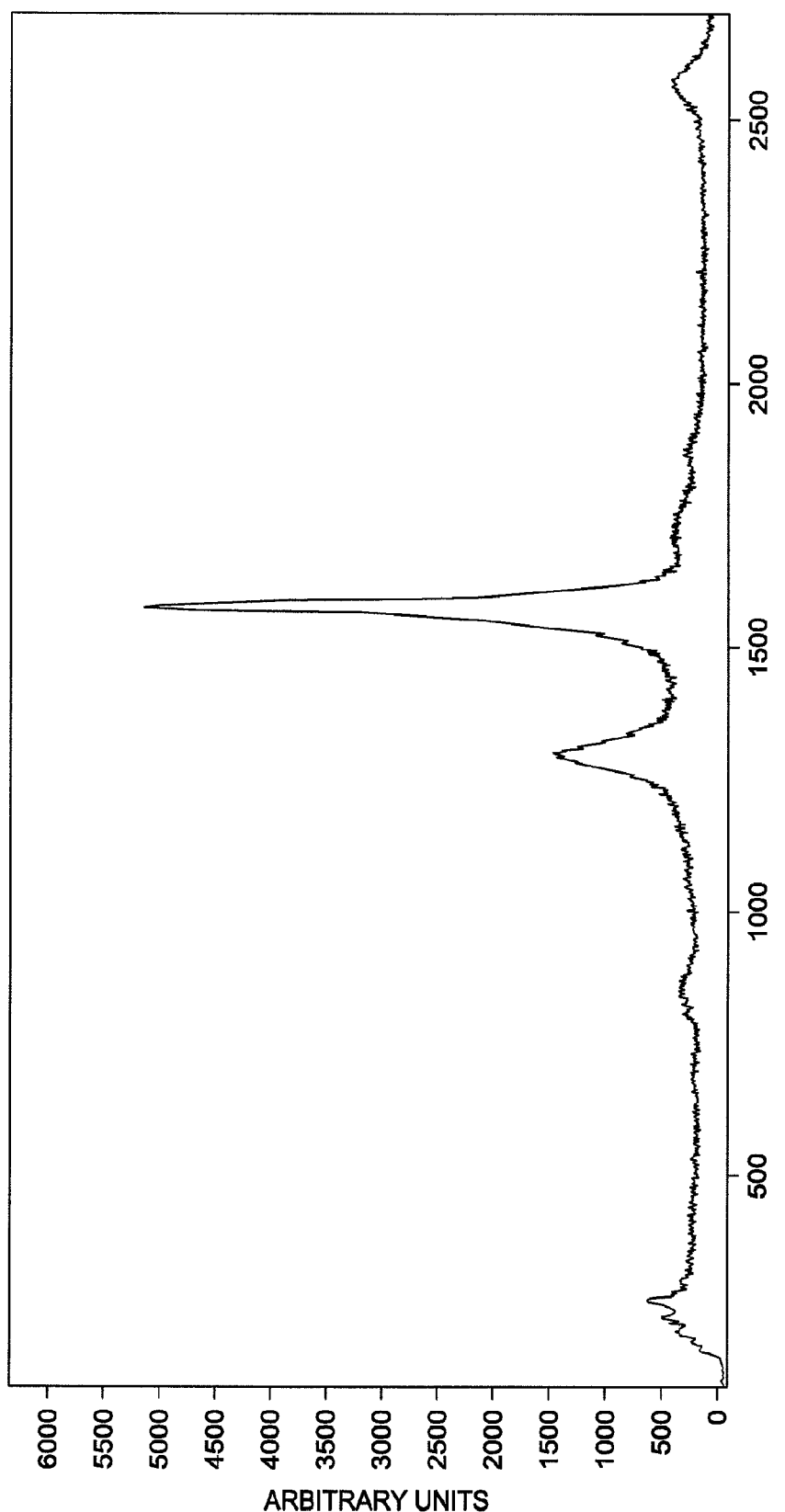
FIG. 20 shows the Raman spectrum of glucose functionalized fluorinated SWCNTs.
Figure 21:
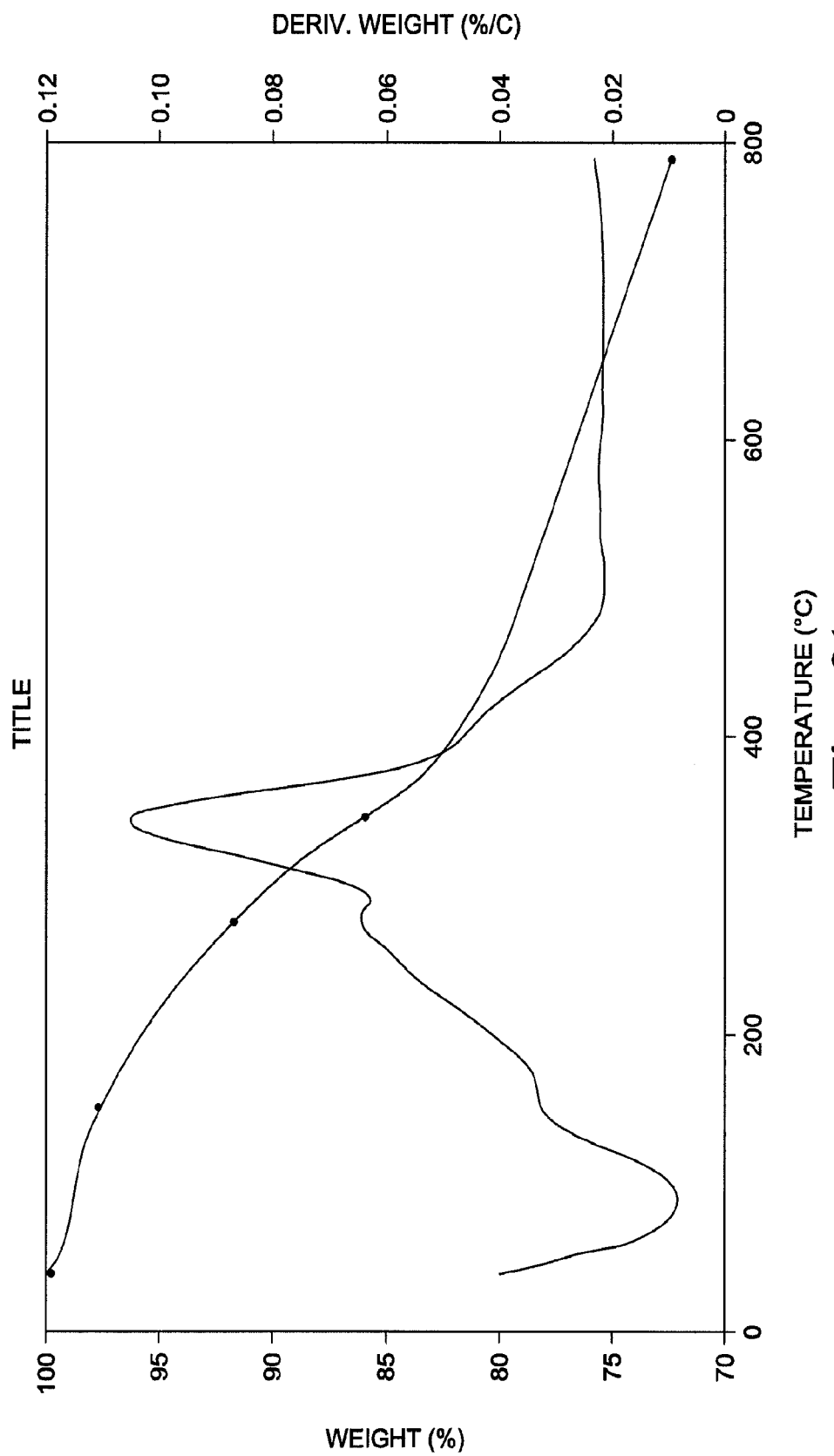
FIG. 21 shows the TGA-DTA plot of glucose functionalized fluorinated SWCNTs.

Fluorinated carbon nanomaterials were functionalized with glucose in an analogous manner to that described for sucrose using the general method. FIGS. 18-21 show data for fluorinated carbon nanostructures functionalized with glucose. FIG. 18 shows the FTIR spectrum of glucose functionalized fluorinated nanodiamond. FIG. 19 shows the FTIR spectrum of glucose functionalized fluorinated SWCNTs. FIG. 20 shows the Raman spectrum of glucose functionalized fluorinated SWCNTs. FIG. 21 shows the TGA-DTA of glucose functionalized fluorinated SWCNTs. The weight loss demonstrated in FIG. 21 (~25%) shows that about 1 in 42 SWCNT carbons carries a covalently bonded glucose substituent.

Example 5

Derivatization of Sucrose Functionalized SWCNTs

The free hydroxyl groups on polyol molecules covalently bound to carbon nanomaterials provide opportunity for further chemical functionalization or derivatization tailored for specific applications. Sucrose functionalized SWCNTs having terminal epoxy groups have been synthesized to demonstrate this concept. The terminal epoxy groups may enable dispersion and integration of derivatized SWCNTs into an epoxy polymer. As shown in FIG. 22, the sucrose functionalized SWCNT was coupled with 4,4'-methylenebis(phenylisocyanate) (step 1) and glycidol (step 2) to produce an epoxy functionalized SWCNT. Both reactions proceeded at room temperature to provide the final product, Epoxy-SWCNT compound 2200. The reactions were carried out as follows:

A dispersion of 50 mg of sucrose functionalized SWCNT was prepared in 200 mL dry acetone. To the dispersion was added 12 mg of 4,4'-methylenebis(phenylisocyanate), and the reaction was stirred at room temperature for 24 hours. To the reaction mixture was then added 10 mg of glycidol, and the reaction was stirred for a further 24 hours. Epoxy-SWCNT compound 2200 was formed and isolated by filtration on a 0.2 μm Teflon membrane.

Figure 23:
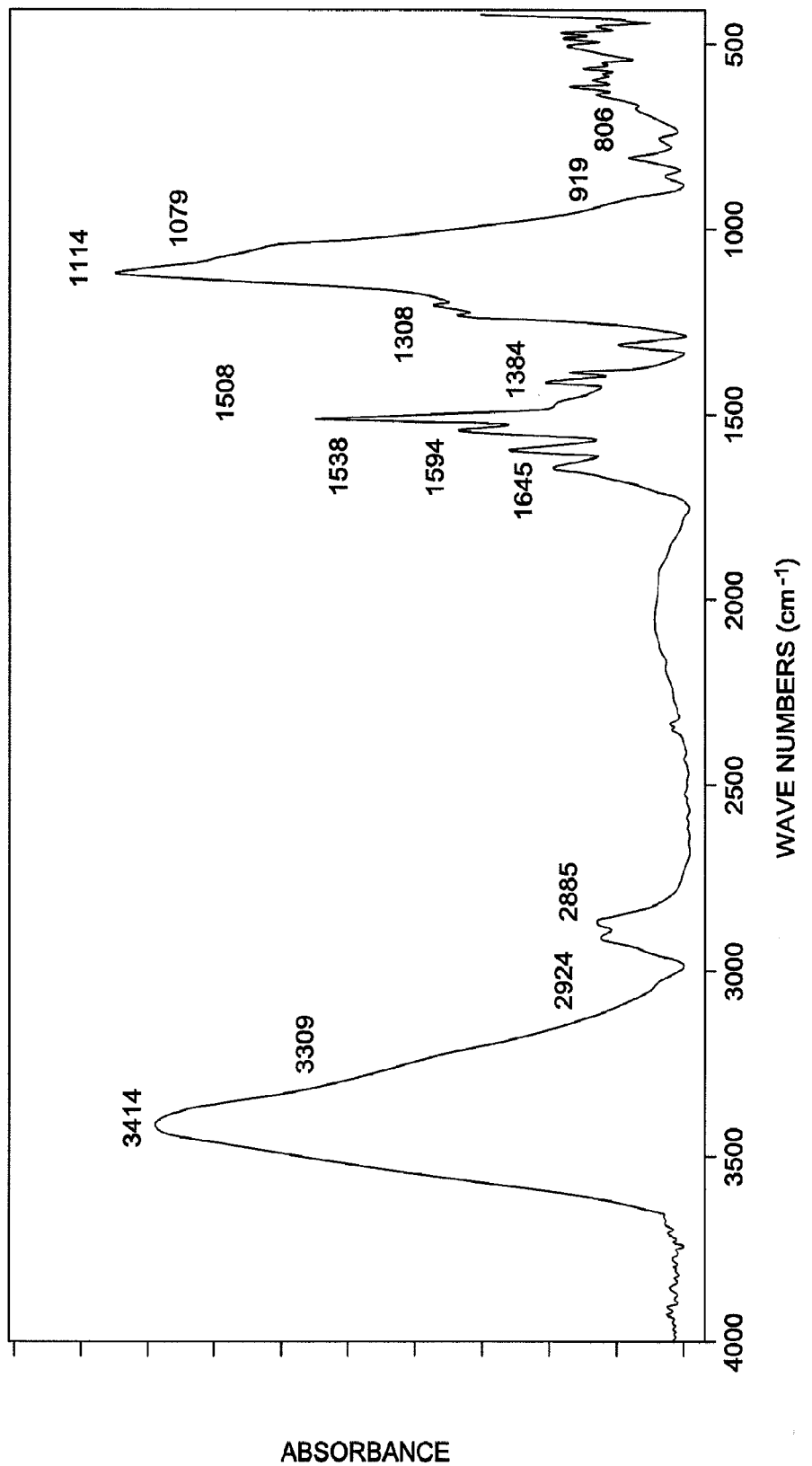
FIG. 23 shows the FTIR spectrum of Epoxy-SWCNT 2200.

Compound 2200 was characterized by FTIR spectroscopy (FIG. 23) and dispersibility in EPON 862/W Cure epoxy polymer system. The IR spectrum of 2200 shows a broad band in the 3000-3600 $cm^{-1}$ region with a peak at 3414 $cm^{-1}$ (O—H stretch) and a distinct shoulder at 3309 $cm^{-1}$ (N—H stretch of the amide group), which is overlapping with the weaker bands of the C—H stretches of phenyl and glycidyl groups in the 3000-3100 $cm^{-1}$ region. Bands at 1645, 1538 and 1508 $cm^{-1}$ characterize the C═O stretch, and N—H bending modes of the C(═O)NH amide units, while peak at 1594 $cm^{-1}$ can be related to the aromatic C═C stretches. Low and medium intensity peaks in 1100-1400 $cm^{-1}$ region are due to the deformation and bending modes of the $CH_2$ and CH of sucrose, glycidyl and aromatic units. The absorptions due to the C—O stretches in the sucrose and epoxy rings can be associated with a shoulder band observed at 1079 $cm^{-1}$ and a weaker bands at 919, 851 and 806 $cm^{-1}$.

Figure 24:
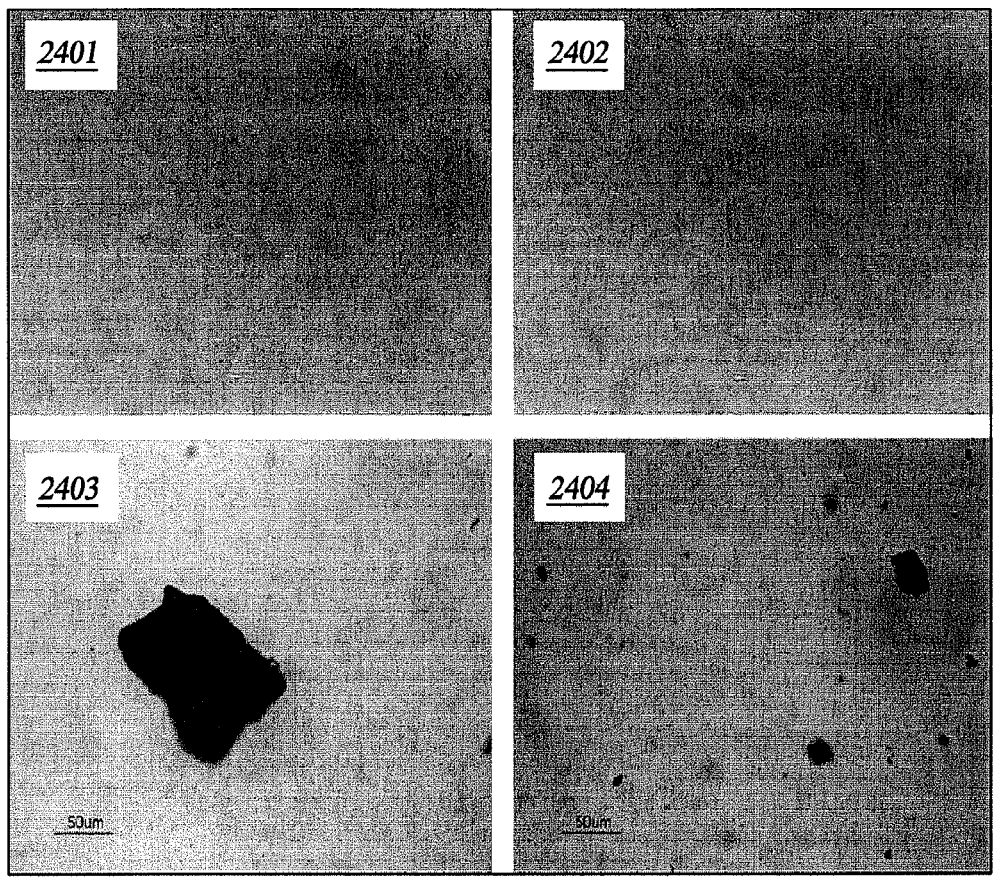
FIG. 24 shows the dispersion of sucrose functionalized SWCNTs and Epoxy-SWCNT 2200 in EPON 862/W Cure epoxy polymer system.

Compound 2200 showed a uniform dispersion at 0.015 wt. % loading into EPON 862/W Cure epoxy polymer system as demonstrated by the photographs and microscope images taken from samples cured in a borosilicate glass mold and shown in FIG. 24. Images 2401 and 2403 are for sucrose functionalized SWCNTs, and images 2402 and 2404 are comparable images for compound 2200. Images 2401 and 2402 are photographs, and images 2403 and 2404 are 20× magnification optical microscope images. These images revealed much smaller size nanotube agglomerates of Epoxy-SWCNTs 2200 than sucrose functionalized SWCNTs, which is indicative of a higher degree of debundling of Epoxy-SWCNTs and stronger interfacial interaction with the epoxy polymer. This property may provide advantageous enhancement of mechanical properties of epoxy composites processed with compounds such as 2200.

From the foregoing description, one skilled in the art can easily ascertain the essential characteristics of this disclosure, and without departing from the spirit and scope thereof, can make various changes and modifications to adapt the disclosure to various usages and conditions, including modifications described hereinabove. The embodiments described hereinabove are meant to be illustrative only and should not be taken as limiting of the scope of the disclosure, which is defined in the following claims:

What is claimed is the following:

1. A water soluble carbon nanostructure comprising:
    a fluorinated carbon nanostructure; and
    a polyol covalently bound to the fluorinated carbon nanostructure,
        wherein the polyol comprises a carbohydrate structure, and
        wherein the carbohydrate structure is directly bound to the fluorinated carbon nanostructure material through a C—O bond.

2. The water soluble carbon nanostructure of claim 1, wherein the fluorinated carbon nanostructure material is selected from the group consisting of fluorinated single-wall carbon nanotubes, fluorinated double-wall carbon nanotubes, fluorinated multi-wall carbon nanotubes, fluorinated fullerenes, fluorinated carbon nano-onions, and fluorinated nanodiamond.

3. The water soluble carbon nanostructure of claim 1, wherein the carbohydrate structure comprises at least one component selected from the group consisting of monosaccharides, disaccharides, trisaccharides, tetrasaccharides, oligosaccharides, polysaccharides, and derivatives and analogs thereof, with the proviso that if the carbohydrate structure is a monosaccharide or a disaccharide, more than three hydroxyl moieties are present in the carbohydrate structure.

4. The water soluble carbon nanostructure of claim 3, wherein the carbohydrate structure comprises sucrose.

5. The water soluble carbon nanostructure of claim 1, wherein the water soluble carbon nanostructure is further derivatized with a derivatizing agent.

6. The water soluble carbon nanostructure of claim 5, wherein the water soluble carbon nanostructure is covalently bound to a polymer matrix.

7. A polymer composite comprising the water soluble carbon nanostructure of claim 1.

8. The polymer composite of claim 7, wherein the water soluble carbon nanostructure is covalently bound to the polymer.

9. The polymer composite of claim 8, wherein the water soluble carbon nanostructure and a curing agent are reacted to form the polymer.

10. The polymer composite of claim 9, wherein the polymer comprises an epoxy.

11. A biosensor comprising the water soluble carbon nanostructure of claim 1.

12. A drug delivery vehicle comprising the water soluble carbon nanostructure of claim 1.

13. A method for making a water soluble carbon nanostructure, said method comprising:
    treating a fluorinated carbon nanostructure material with a polyol in the presence of a base,
    wherein the polyol comprises a carbohydrate structure,
    wherein the treating results in formation of a direct covalent bond between the fluorinated carbon nanostructure material and the carbohydrate structure, and
    wherein the covalent bond comprises a C—O bond.

14. The method of claim 13, wherein the fluorinated carbon nanostructure material is selected from the group consisting of fluorinated single-wall carbon nanotubes, fluorinated double-wall carbon nanotubes, fluorinated multi-wall carbon nanotubes, fluorinated fullerenes, fluorinated carbon nano-onions, and fluorinated nanodiamond.

15. The method of claim 13, wherein the carbohydrate structure comprises at least one component selected from the group consisting of monosaccharides, disaccharides, trisaccharides, tetrasaccharides, oligosaccharides, polysaccharides, and derivatives and analogs thereof, with the proviso that if the carbohydrate structure is a monosaccharide or a disaccharide, more than three hydroxyl moieties are present in the carbohydrate structure.

16. The method of claim 13, wherein the carbohydrate structure comprises sucrose.

17. The method of claim 13, wherein the base comprises a hydroxide source.

18. The method of claim 17, wherein the hydroxide source is selected from the group consisting of ammonium hydroxide, sodium hydroxide, potassium hydroxide, and lithium hydroxide.

19. The method of claim 18, wherein the hydroxide source is lithium hydroxide.

* * * * *

UNITED STATES PATENT AND TRADEMARK OFFICE
CERTIFICATE OF CORRECTION

PATENT NO.       : 8,420,717 B2                                                                 Page 1 of 1
APPLICATION NO.  : 12/670068
DATED            : April 16, 2013
INVENTOR(S)      : Khabashesku et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 501 days.

Signed and Sealed this
First Day of September, 2015

Michelle K. Lee
*Director of the United States Patent and Trademark Office*